(12) United States Patent
Zarich et al.

(10) Patent No.: US 11,564,421 B2
(45) Date of Patent: Jan. 31, 2023

(54) INTERACTIVE OBJECT HAVING LIGHT-TRANSMISSIVE PATTERN WITH CONTROLLED HOLE-SHAPE

(71) Applicant: Google LLC, Mountain View, CA (US)

(72) Inventors: Mark Zarich, Oakland, CA (US); Tong Wu, Mountain View, CA (US); Bryan Allen, Emeryville, CA (US); Brendon Beardsley, Lake Stevens, WA (US); Adam Bernstein, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 84 days.

(21) Appl. No.: 16/972,443

(22) PCT Filed: Jan. 23, 2019

(86) PCT No.: PCT/US2019/014709
§ 371 (c)(1),
(2) Date: Dec. 4, 2020

(87) PCT Pub. No.: WO2020/131141
PCT Pub. Date: Jun. 25, 2020

(65) Prior Publication Data
US 2021/0227896 A1  Jul. 29, 2021

Related U.S. Application Data
(60) Provisional application No. 62/783,704, filed on Dec. 21, 2018.

(51) Int. Cl.
*A41D 1/00* (2018.01)
*A41D 27/08* (2006.01)
(Continued)

(52) U.S. Cl.
CPC ............ *A41D 1/005* (2013.01); *A41D 27/085* (2013.01); *F21V 23/0435* (2013.01);
(Continued)

(58) Field of Classification Search
CPC .. A41D 1/005; A41D 27/085; F21V 23/0485; F21V 11/16; F21V 23/06; F21V 33/008; A45C 15/06
(Continued)

(56) References Cited

U.S. PATENT DOCUMENTS

| 6,518,543 B1 | 2/2003 | Benz et al. | |
| 8,136,425 B2 * | 3/2012 | Bostick | B62D 1/046 74/552 |

(Continued)

FOREIGN PATENT DOCUMENTS

| CN | 104510084 | 4/2015 |
| GB | 2316429 | 2/1998 |

OTHER PUBLICATIONS

International Search Report and Written Opinion for PCT/US2019/014709, dated Aug. 23, 2019, 23 pages.
(Continued)

*Primary Examiner* — Laura K Tso
(74) *Attorney, Agent, or Firm* — Dority & Manning, P.A.

(57) ABSTRACT

Systems and methods for interactive objects including illuminated surfaces are provided. An interactive object includes a flexible substrate comprising a soft material that is non-transmissive to light. The interactive object includes a plurality of holes extending from an inside surface of the flexible substrate to an outside surface of the flexible substrate to form a light-transmissive pattern at one or more locations of the flexible substrate. An illuminated surface is positioned adjacent to the inside surface of the flexible substrate with its front surface extending along at least a (Continued)

portion of the inside surface of the flexible substrate at the one or more locations including the plurality of holes. The interactive object includes one or more electronic components electrically coupled to the illuminated surface to control the illuminated surface to provide a visual output.

26 Claims, 12 Drawing Sheets

(51) Int. Cl.
*F21V 23/04* (2006.01)
*F21V 23/06* (2006.01)
*F21V 33/00* (2006.01)
*G06F 3/044* (2006.01)

(52) U.S. Cl.
CPC .......... *F21V 23/0485* (2013.01); *F21V 23/06* (2013.01); *F21V 33/0008* (2013.01); *G06F 3/044* (2013.01); *G06F 2203/04102* (2013.01)

(58) Field of Classification Search
USPC ................................ 362/103, 108, 154, 156
See application file for complete search history.

(56) References Cited

U.S. PATENT DOCUMENTS

| | | | |
|---|---|---|---|
| 9,656,598 B1 * | 5/2017 | Salter | G02B 6/0008 |
| 10,001,592 B2 | 6/2018 | Oh et al. | |
| 10,813,428 B1 * | 10/2020 | Ansell | A45C 3/06 |
| 2014/0185275 A1 | 7/2014 | Smith | |
| 2016/0154170 A1 | 6/2016 | Thompson et al. | |
| 2017/0114982 A1 | 4/2017 | Nashnet et al. | |
| 2018/0324928 A1 | 11/2018 | Andre et al. | |

OTHER PUBLICATIONS

Waurzyniak, "Lasers Drill Precision Holes Quickly", Laser Drilling, SME Media, Nov. 1, 2013, pp. 69-77.

* cited by examiner

INTERACTIVE OBJECT HAVING LIGHT-TRANSMISSIVE PATTERN WITH CONTROLLED HOLE-SHAPE

PRIORITY CLAIM

The present application is based upon and claims the right of priority under 35 U.S.C. § 371 to International Application No. PCT/US2019/014709, filed Jan. 23, 2019, which claims priority to and the benefit of U.S. Provisional Application Ser. No. 62/783,704, filed Dec. 21, 2018. Applicant claims priority to and the benefit of each of such applications and incorporates all such applications herein by reference in their entirety.

FIELD

The present disclosure relates generally to interactive objects including light sources.

BACKGROUND

An interactive object such as an interactive garment, garment accessory, or garment container may include a light source and optionally a touch input device such as a capacitive touch sensor that is configured to detect touch-input. The light source may be controlled by circuitry incorporated into the object. For example, the light source can provide an output based on input received via the circuitry from a remote computing device such as a smartphone.

While it is known to incorporate light sources with interactive objects, the effective integration of light sources with flexible materials from which interactive objects are often formed remains a problem. For instance, many interactive objects utilize a flexible substrate to construct the object. In these cases, it can be difficult to fully integrate a light source into the interactive object. Such problems may be even more difficult where the light source is an illuminated surface such as a display whose luminescent output may be limited.

Accordingly, there remains a need for an interactive object having a light source that is fully and effectively integrated within the interactive object. Additionally, there remains a need for manufacturing processes that can efficiently and effectively manufacture such objects.

SUMMARY

Aspects and advantages of embodiments of the present disclosure will be set forth in part in the following description, or may be learned from the description, or may be learned through practice of the embodiments.

One example aspect of the present disclosure is directed to an interactive object. The interactive object comprises a flexible substrate comprising a soft material that is non-transmissive to light. A plurality of holes extend from an inside surface of the flexible substrate to an outside surface of the flexible substrate. The plurality of holes form a light-transmissive pattern at one or more locations of the flexible substrate. Each hole includes a first opening at the inside surface of the flexible substrate and a second opening at the outside surface of the flexible substrate. An illuminated surface is adjacent to the inside surface of the flexible substrate. The illuminated surface extends along at least a portion of the inside surface of the flexible substrate at the one or more locations including the plurality of holes. One or more electronic components are electrically coupled to a light source of the illuminated surface. The one or more electronic components are configured to control the light source to provide a visual output via the illuminated surface.

Other example aspects of the present disclosure are directed to systems, apparatus, computer program products (such as tangible, non-transitory computer-readable media but also such as software which is downloadable over a communications network without necessarily being stored in non-transitory form), user interfaces, memory devices, and electronic devices for interactive objects including light-transmissive patterns and manufacturing processes for the same.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
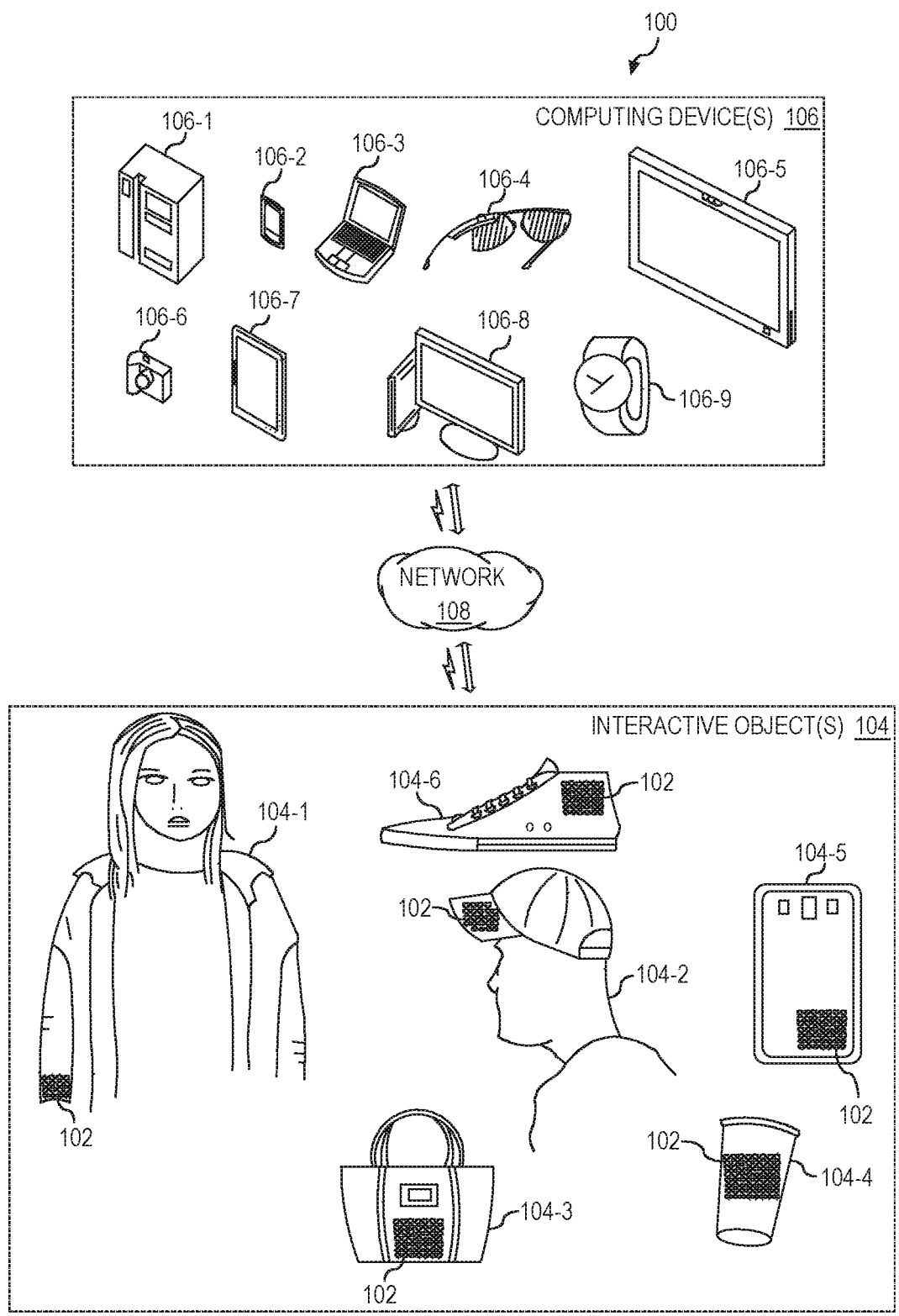
FIG. 1 depicts a block diagram of an example computing environment in which an interactive object including a light-transmissive pattern in accordance with example embodiments of the present disclosure can be implemented.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Generally, the present disclosure is directed to an interactive object including a light-transmissive pattern formed in a flexible substrate and an illuminated surface positioned adjacent to an inside surface of the flexible substrate. The illuminated surface can illuminate the light-transmissive pattern at an outside surface of the flexible substrate to generate a visual display at a location on the interactive object. More particularly, the light-transmissive pattern can include a plurality of holes that extend through the flexible substrate from the inside surface to the outside surface. The illuminated surface can be positioned adjacent to the inside surface of the flexible substrate at a one or more locations corresponding to the light-transmissive pattern. In this manner, light can be transmitted from the illuminated surface at the inside surface of the flexible substrate through the holes so as to be viewable at one or more locations at the outside surface. The holes can have a controlled shape, spacing, and/or alignment to maximize light transmission through the flexible substrate and/or to focus a direction of light emissions from the interactive object.

By way of example, the interactive object can include a garment, garment accessory, or garment container at least partially formed of a flexible substrate having a set of holes that provides a light-transmissive pattern at one or more locations of the flexible substrate. The flexible substrate may be formed of a soft material such as leather, natural fibers, synthetic fibers, or networks of such fibers. The flexible substrate may include a textile such as a woven or non-woven fabric, or other materials such as flexible plastics, films, etc. Materials may be formed by weaving, knitting, crocheting, knotting, pressing threads together or consolidating fibers or filaments together in a nonwoven manner. An illuminated surface can be positioned adjacent to the inside surface of the flexible substrate and coupled to one or more electronics modules of the interactive object that control a light source of the illuminated surface to provide a visual output. For example, an electronics module can communicate with a remote computing device such as a smartphone or other user computing device to provide notifications, alerts, or other messages via the illuminated surface. Additionally and/or alternatively, the one or more electronics modules can communicate with an input device such as an interactive textile forming a capacitive touch sensor integrated into the interactive object and provide a visual output based on touch inputs via the capacitive touch sensor.

According to example embodiments, each hole of the light-transmissive pattern may be formed with a first opening at the inside surface of the flexible substrate that is larger than a second opening at the outside surface of the flexible substrate. By way of example, each hole of the light-transmissive pattern can be formed in the flexible substrate with at least a partial conical shape. More particularly, each hole can have a first opening at the inside surface of the flexible substrate that is larger than a second opening at the outside surface of the flexible substrate. The larger opening of each hole can be formed adjacent to the illuminated surface which is positioned adjacent to the inside surface of the flexible substrate. In this manner, more light can be transmitted through each hole to illuminate the light-transmissive pattern formed on the outside surface of the flexible substrate.

In some implementations, the sidewall of each hole can be angled relative to a direction that is normal to the outside surface and the inside surface. The sidewall of each hole can define a substantially constant angle relative to the inside and outside surfaces, forming a relatively continuous conical shape between the first opening at the inside surface to the second opening at the outside surface of the flexible substrate.

In some implementations, each hole can include a plurality of individual vertical sections, also referred to as rings, which together form a conical shape of the hole between the first opening and the second opening. Each vertical section can include a substantially vertical sidewall that extends in the direction normal to the outside surface and the inside surface. The diameter of each vertical section can be substantially constant along its length in the vertical direction. The individual vertical sections of each hole have a different diameter to form a conical hole shape. The vertical section adjacent to the inside surface has a largest diameter for the hole. The diameter of each other vertical section of the hole is less than the diameters of vertical sections of the hole that are closer to the first opening at the inside surface.

According to some example aspects, the holes of the light-transmissive pattern can be formed at an angle that is offset from the direction normal to the outside surface and the inside surface of the flexible substrate. Each hole can have a sidewall that defines a hole direction that intersects the inside surface and the outside surface of the flexible substrate at an angle offset from a direction normal to the inside surface and the outside surface. In this manner, a controlled viewing angle can be provided for at least a portion of the light-transmissive pattern. For example, an interactive garment or garment accessory can include a light-transmissive pattern having holes that are formed at an angle relative to the front surface. The angle relative to the front surface can be in alignment with an expected viewing angle of a user while wearing the garment and/or garment accessory. This may permit a user to view the illuminated surface output without purposefully positioning the interactive garment so that the user's viewing angle is normal to the outside surface of the interactive object. Moreover, such a technique can enhance privacy by restricting the viewable area to that of the user so that others are unable to see the output of the illuminated surface under normal circumstances.

In some examples, an interactive object can include holes formed in different directions and/or at different angles so that different outputs of the illuminated surface can be directed for different viewing angles. In this manner, some outputs of the illuminated surface can be focused in a direction of a wearer of the interactive garment, while other outputs of the illuminated surface can be focused in other directions. By way of example, a first display type such as a notification or alert from a user's smartphone or other computing device can be directed to a portion of the illuminated surface adjacent to holes that are viewable by a wearer of the interactive object. A second display type such as a general illumination intended to illuminate the pattern for general view can be output to holes that are viewable with a wider viewing angle and at a different direction (e.g., in the direction normal to the outside surface).

The size, shape, and spacing between holes for a light-transmissive pattern can vary based on a particular application or implementation. A hole can generally include any three-dimensional volume having flat surfaces at the terminal ends in a normal direction relative to the surfaces of the substrate. A hole can be conical, polygonal, or polyhedrical in example embodiments. By way of example, a hole can define a conical volume in some examples. A first end of the conical volume can be a flat surface in the plane of the inside surface of the flexible substrate and the second end of the conical volume can be a flat surface in the plane of the outside surface of the flexible substrate. The flat surface at the outside surface can be smaller than the flat surface at the inside surface.

According to example aspects of disclosed technology, a laser drilling process can be used to form and control the shape of holes formed in a flexible substrate of an interactive garment. A laser drilling process can maintain a controlled shape of the holes and spacing between the holes (also referred to as pitch) in the flexible substrate so that a wider viewing angle and/or controlled viewing angle is provided. By way of example, the flexible substrate for an interactive object can be positioned within the workspace of a laser drilling machine capable of drilling holes with millimeter or sub-millimeter accuracy. The laser drilling machine can be in communication with one or more computing devices that permit controlled drilling operations to be performed at high speeds. For example, a complete sequence of drilling operations to form the holes for a light-transmissive pattern can be programmed for execution by the laser drilling machine under control of the computing device(s).

In accordance with some example embodiments, a sequence of drilling operations can be performed to form a conical-shaped hole having a plurality of vertical sections. A plurality of laser drilling operations can be performed with a laser beam having a successively smaller diameter for each laser drilling operation. Each laser drilling operation can form one of the plurality of vertical sections. For example, the beam power can be set such that the laser beam only cuts through a portion of the flexible substrate. The beam width or diameter can be set to a target size for the first opening of the hole at the inside surface of the flexible substrate. The beam can be focused at the inside surface and applied to form a first vertical section for the hole. The beam diameter can then be slightly decreased and reapplied to form a second vertical section for the hole. This process can repeat until a final drilling operation is performed at the intended diameter of the second opening of the hole at the outside surface. The final application of the laser performs a through-cut of the flexible substrate and defines the second opening. By using a multi-pass process, a series of vertical sections can be formed with progressively decreasing diameters from the vertical section closest to the inside surface to the vertical section closest to the outside surface. The resulting hole comprises a set of stepped sections or rings that form a conical shape for the hole. The quantity of passes can vary and may be determined based on the thickness of the flexible substrate in example embodiments.

According to some aspects, a flexible substrate may be placed on a fixture for application of the laser beam to the inside surface of the flexible substrate. The fixture may be used to set an angle for forming the hole. To change the angle, the fixture may be adjusted, either manually or automatically. In some examples, a new fixture can be used to adjust the angle.

In example alternative embodiments, die cutting or machining may be used to form a conical-shaped hole. A machining process, for example, may use a chamfered end mill to drill or machine a conical shape into the flexible substrate for each hole.

In accordance with example embodiments, an illuminated surface may include a simple light source having a panel with a surface, or may include a more enhanced light source such as an LED panel, OLED panel, etc. In some implementations, the illuminated surface is an electroluminescent (EL) light panel (also referred to as EL paper). An EL light panel can be extremely thin. In some example, the EL light panel is a thin laminated panel including phosphor. An EL panel or other light panel can be flexible to adapt to curved surfaces and surfaces which change over time. In other implementations, the illuminated surface may include a light source such as a light pipe or LED light source. Light pipes or tubes can include a pipe for transmitting and/or distributing light for illumination. An illuminated surface may be frontlit or backlit. For example, a light pipe may illuminate the surface from the back or front. In some examples, a light panel can be edge-lit, such as by using edge-lit LEDs. An illuminated surface can be a reflective panel that can reflect light under normal lighting conditions and/or reflect a flash from a camera or other light source. The light source can be integrated with the illuminated surface, such as with an LED panel or EL paper, or can be external to the illuminated surface, such as where the illuminated surface is a reflector.

In some example embodiments, the illuminated surface can be removable from and insertable into the interactive object. For instance, the interactive object may include a pouch or other retaining member to facilitate coupling of the illuminated surface to the flexible substrate or other portion of the interactive object. The pouch can be formed so that when inserted, the front of the illuminated surface is adjacent to the inside surface of the flexible substrate at the location(s) of the light-transmissive pattern. The pouch can be a user-accessible pouch. In some embodiments, the illuminated surface can be directly attached to the interactive object. For instance, the illuminated surface can be sewn, glued, fastened, or in any other suitable manner affixed to the flexible substrate or other portion of the interactive object. The illuminated surface can be attached to the interactive object so that when inserted, the front of the illuminated surface is adjacent to the inside surface of the flexible substrate at the location(s) of the light-transmissive pattern.

According to some example implementations, the interactive object can include an internal electronics module that is integrated into an interactive object. The illuminated surface can be directly attached to the internal electronics module or can be attached to the internal electronics module via one or more connector components. The internal electronics module can provide power and/or control signals to the light source of the illuminated surface. The internal electronics module may not include an on-board power source in some embodiments. Instead, a removable electronics module can supply power to the internal electronics module.

In some examples, the internal electronics module can include one or more drivers for the illuminated surface. The internal electronics module can include a first subset of electronic components, such as one or more drivers configured to provide control signals and/or power to the illuminated surface. The internal electronics module in some examples comprises a controller that is configured to generate control signals for the illuminated surface based on communication with other electronic components. The controller can be configured to communicate control signals such as from a remote computing device. In some examples, the internal electronics module comprises a flexible printed circuit board (PCB). The printed circuit board can include a set of contact pads and/or one or more ports for attaching to the illuminated surface. In some examples, the printed circuit board includes a microprocessor. A portion of the PCB (e.g., including the microprocessor) can be overmolded with a polymer composition.

In some embodiments, a removable electronics module that includes a second subset of electronic components (e.g., a microprocessor, power source, or network interface) can be removably coupled to the interactive object via a communication interface. The communication interface enables communication between the internal electronics module and the removable electronics module when the removable electronics module is coupled to the interactive object. In example embodiments, the removable electronics module can be removably mounted to a rigid member on the interactive object. A connector can include a connecting device for physically and electrically coupling to the removable electronics module. The internal electronics module can be in communication with the connector. The internal electronics module can be configured to communicate with the removable electronics module when connected to the connector. A controller of the removable electronics module can receive information and send commands to the internal electronics module. A communication interface is configured to enable communication between the internal electronics module and the controller when the connector is coupled to the removable electronics module. For example, the communication interface may comprise a network interface integral with the removable electronics module. The removable electronics module can also include a rechargeable power source. The removable electronics module can be removable from the interactive object for charging the power source. Once the power source is charged, the removable electronics module can then be placed back into the interactive object and electrically coupled to the connector.

According to some embodiments, a capacitive touch sensor formed from one or more sets of conductive lines such as conductive threads or lines formed from one or more conductive films can be coupled to the internal electronics module that is integrated into an interactive object. The set(s) of conductive lines can be directly attached to the internal electronics module or can be attached to the internal electronics module via one or more connector components.

The internal electronics module can include electronic components, such as sensing circuitry configured to detect touch-input to the conductive lines. The sensing circuitry in some examples comprises a controller that is configured to detect a touch-input when user pressure is applied to the conductive threads, for example. The controller can be configured to communicate the touch-input data to a computing device. In some examples, the controller comprises a flexible printed circuit board (PCB). The printed circuit board can include a set of contact pads for attaching to the conductive lines. By way of example, the internal electronics module can be configured to provide control signals to the illuminated surface based on touch inputs received at the capacitive touch sensor.

Touch inputs provided via a capacitive touch sensor as described may include various applications and capabilities. By way of example, a touch sensor may be used as a button to detect a simple touch input at a location of the touch sensor. In some examples, a one-dimensional array of conductive threads may be used to implement a touch sensor that can detect a button-type input. A one-dimensional array of conductive threads may also be used to detect a one-dimensional swipe input (e.g., movement in a single direction corresponding to the spacing between threads). In some examples, a two-dimensional array of conductive threads may be used to implement a touch sensor that can detect trackpad inputs, including a specific location of a touch within a grid of conductive threads. Additionally, a two-dimensional array of conductive threads may be used to detect various gesture inputs, authentication inputs, predefined keystrokes, movements, user-specific natural behaviors and the like. One or more machine-learned models may be used to detect user inputs based on training the machine-learned models using training data. Additionally, the touch sensor may be configured to detect analog and pseudo-force inputs from a capacitive change caused by a finger distance.

According to some aspects, the illuminated surface can be responsive to inputs received via an external computing device (e.g., smartphone, tablet, laptop, etc.). The external computing device can be communicatively coupled to the interactive object using one or more wireless and/or wired interfaces. A gesture manager can be implemented on the computing device to store mappings between gestures and functionalities of the computing device. A functionality mapped to a gesture can be initiated in response to detecting the gesture at the capacitive touch sensor. The illuminated surface can be responsive to gestures detected by the internal electronics module, removable electronics module, remote computing device, or any combination of the above.

Embodiments of the disclosed technology provide a number of technical effects and benefits, particularly in the areas of computing technology, displays, and the integration of the two with interactive objects such as wearable garments. By forming controlled-shaped holes having different opening sizes in a flexible substrate, a wider viewing angle for an illuminated surface integrated into an interactive object can be provided. A conical shape of individual holes in a light-transmissive pattern, for example, can increase the amount of light that is viewable from the outside surface of the flexible substrate. Such a technique can permit illuminated surface such as light panels, displays, etc. to be seamlessly integrated into interactive objects such as garments, garment accessories, and garment containers that are formed from soft materials. Additionally, by forming holes at particular angles relative to the outside surface of a flexible substrate, one or more controlled viewing angles can be provided for an interactive object. For instance, the viewing angle of the illuminated surface output can be controlled to align with the expected viewing angle of a user. In this manner, a user can more easily view the output of the interactive object. Moreover, such a technique can enhance privacy, for example, by restricting the viewing angle of the output of an illuminated surface to that of the user or wearer of the interactive object, while inhibiting view of the output by others. Additionally, multiple output directions can be defined so that different outputs of the illuminated surface can be directed to different audiences.

A multi-pass laser drilling process allows a controlled shape of individual holes and a pitch between holes to be defined. Laser drilling processes can be controlled by one or more computing devices executing instructions that define a sequence of drilling operations. This can allow processes to be quickly modified and changed to generate different light-transmissive patterns, for example. For instance, custom patterns can be provided for individual users without requiring physical retooling or manual processes often associated with such customizations. Laser drilling allows the system to be easily adapted for various thicknesses of flexible substrates and can easily drill holes of different shapes and/or sizes.

Aspects of the disclosed technology additionally provide improved integration of illuminated surfaces into flexible substrates. For example, a light-transmissive pattern may be formed in an existing flexible substrate using a laser drilling process. Through a laser drilling process, numerous shapes, edges, designs, etc. can be formed. The light-transmissive pattern can conform to the flexible substrate. Moreover, the pattern can be formed with a custom placement on the flexible substrate. Such a technique can be contrasted with traditional manufacturing processes that require retooling, etc. to make design changes. Such techniques can be expensive and may not be suitable to frequent or last minute design changes. With a laser drilling process as described, the pattern can be placed in a custom location with reduced complexity and costs associated with design changes. By way of example, a name or logo may be formed on a garment or accessory with a custom placement of the light-transmissive pattern to form the name or logo on the garment or accessory. This process can be repeated for multiple names or logos without requiring re-tooling. Rather, the same process can be used to construct multiple objects with individual light-transmissive patterns. Custom designs and placements can be applied to the objects in a cost-effective and efficient manner.

Additionally, one or more aspects of the disclosed technology may address problems that may arise when providing a flexible product having an illuminated surface such as a display. In accordance with embodiments of the disclosed technology, an illuminated surface can be integrated into the product in a way that sufficient luminosity can be provided at a reasonable cost. Such a flexible product having an illuminated surface can provide a visual output including multiple different colors and visual effects. Moreover, a display integrated using a light-transmissive pattern as described can provide a light output in many different appealing manners, while remaining lightweight and having low power requirements.

Typical high-resolution illuminated displays are often high-cost. For example, high-resolution OLED or "Retina" type displays, which are often associated with newer cell phones and similar smart devices, are often not designed for high brightness applications, and their cost and power requirements only increase as their brightness specifications are increased. Accordingly, a mechanically-flexible illuminated surface is provided according to some embodiments. The illuminated surface underlies the flexible substrate, such that the core product remains desirable and useful for its main purpose. For example, a handbag, backpack, or other garment or accessory can remain functional as a handbag, etc. while seamlessly integrating a visual display. Such products can be rendered even that much more desirable and useful. Flexible illuminated surfaces, such as those announced for the newest of certain flexible cell phones, introduce even more issues with regard to brightness, cost, and power trade-offs. The disclosed technology provides a solution that addresses the many, and often-competing factors that make a suitable end-product. For example, example aspects can provide a solution that addresses brightness, visual-content-flexibility, cost, power, and physical characteristics such as mechanical flexibility. In accordance with example embodiments, a product including an illuminated surface and light-transmissive pattern is provided that can maximize the ability for as many emitted photons as possible to get through the holes of a flexible substrate and into the eye of the viewer. The maximization of light transmission is one of the features and advantages provided by the shaped holes according to one or more of the described embodiments.

FIG. 1 is an illustration of an example environment 100 in which an interactive object including an integrated illuminated surface such as a display can be implemented. Environment 100 includes a light-transmissive pattern 102 which is shown as being integrated within various interactive objects 104. Light-transmissive pattern 102 includes a plurality of holes that extend through a flexible substrate that forms at least a portion of each of the interactive objects. Each hole extends from an outside surface to an inside surface of the flexible substrate. The illuminated surface is positioned adjacent to the inside surface of the flexible substrate. In this manner, an output of the illuminated surface may pass through the flexible substrate via the holes so that it may be viewable from one or more locations external to the interactive object. In some examples, the holes may have a larger opening at the inside surface and smaller opening at the outside surface. Such a design can allow more light to be transmitted from the illuminated surface through the flexible substrate. In some examples, the holes may be formed at an angle offset from the direction normal to the outside surface of the flexible substrate. By forming the holes at one or more angles, the viewing area of the illuminated surface can be controlled.

Although not shown, interactive objects 104 may additionally include a capacitive touch sensor that is configured to sense touch-input (e.g., multi-touch input). For example, an interactive textile forming a capacitive touch sensor may be incorporated into interactive object 104. A textile may include any type of flexible woven material consisting of a network of natural or artificial fibers, often referred to as thread or yarn. Textiles may be formed by weaving, knitting, crocheting, knotting, pressing threads together or consolidating fibers or filaments together in a nonwoven manner.

In environment 100, interactive objects 104 include "flexible" objects, such as a shirt 104-1, a hat 104-2, a handbag 104-3 and a shoe 104-6. It is to be noted, however, that an illuminated surface and light-transmissive pattern 102 may be integrated within any type of flexible object made from leather, fabric, or a similar flexible material, such as garments or articles of clothing, garment accessories, garment containers, blankets, shower curtains, towels, sheets, bed spreads, or fabric casings of furniture, to name just a few. Examples of garment accessories may include sweat-wicking elastic bands to be worn around the head, wrist, or bicep. Other examples of garment accessories may be found in various wrist, arm, shoulder, knee, leg, and hip braces or compression sleeves. Headwear is another example of a garment accessory, e.g. sun visors, caps, and thermal balaclavas. Examples of garment containers may include waist or hip pouches, backpacks, handbags, satchels, hanging garment bags, and totes. Garment containers may be worn or carried by a user, as in the case of a backpack, or may hold their own weight, as in rolling luggage. Light-transmissive pattern 102 may be formed in a flexible object 104 in a variety of different ways, including laser drilling, die-cutting, and machining.

In this example, objects 104 further include "hard" objects, such as a plastic cup 104-4 and a hard smart phone casing 104-5. It is to be noted, however, that hard objects 104 may include any type of "hard" or "rigid" object made from non-flexible or semi-flexible materials, such as plastic, metal, aluminum, and so on. For example, hard objects 104 may also include plastic chairs, water bottles, plastic balls, or car parts, to name just a few. In another example, hard objects 104 may also include garment accessories such as chest plates, helmets, goggles, shin guards, and elbow guards. Alternatively, the hard or semi-flexible garment accessory may be embodied by a shoe, cleat, boot, or sandal. A light-transmissive pattern 102 in a flexible substrate may be integrated within hard objects 104 using a variety of different manufacturing processes. In one or more implementations, injection molding is used to integrate a flexible substrate with a light-transmissive pattern into hard objects 104.

An illuminated surface enables a user to view an output associated with the object 104 that the illuminated surface is integrated with, and/or to view an output of a variety of other computing devices 106 via a network 108. Computing devices 106 are illustrated with various non-limiting example devices: server 106-1, smart phone 106-2, laptop 106-3, computing spectacles 106-4, television 106-5, camera 106-6, tablet 106-7, desktop 106-8, and smart watch 106-9, though other devices may also be used, such as home automation and control systems, sound or entertainment systems, home appliances, security systems, netbooks, and e-readers. Note that computing device 106 can be wearable (e.g., computing spectacles and smart watches), non-wearable but mobile (e.g., laptops and tablets), or relatively immobile (e.g., desktops and servers).

Network 108 includes one or more of many types of wireless or partly wireless communication networks, such as a local-area-network (LAN), a wireless local-area-network (WLAN), a personal-area-network (PAN), a wide-area-network (WAN), an intranet, the Internet, a peer-to-peer network, point-to-point network, a mesh network, and so forth.

Interactive object 104 can interact with computing devices 106 by receiving control signals through network 108 for controlling an output of the illuminated surface or for other functions. Additionally, a computing device 106 can use touch data from a capacitive touch sensor of an interactive object 104 to control computing device 106 or applications at computing device 106. As an example, consider that an interactive textile integrated at shirt 104-1 may be configured to control the user's smart phone 106-2 in the user's pocket, television 106-5 in the user's home, smart watch 106-9 on the user's wrist, or various other appliances in the user's house, such as thermostats, lights, music, and so forth. For example, the user may be able to swipe up or down on an interactive textile integrated within the user's shirt 104-1 to cause the volume on television 106-5 to go up or down, to cause the temperature controlled by a thermostat in the user's house to increase or decrease, or to turn on and off lights in the user's house. Note that any type of touch, tap, swipe, hold, or stroke gesture may be recognized by an interactive textile. The interactive textile or electronics within the interactive object 104 can send a control signal to the illuminated surface causing the illuminated surface to generate an output in accordance with the user's input. For example, the illuminated surface may provide an indication that the user's input was successfully recognized and/or acted upon. Additionally, and/or alternatively, the computing device 106 may respond to user input at the interactive textile by sending a control signal to the illuminated surface causing the illuminated surface to generate an output.

Figure 2:
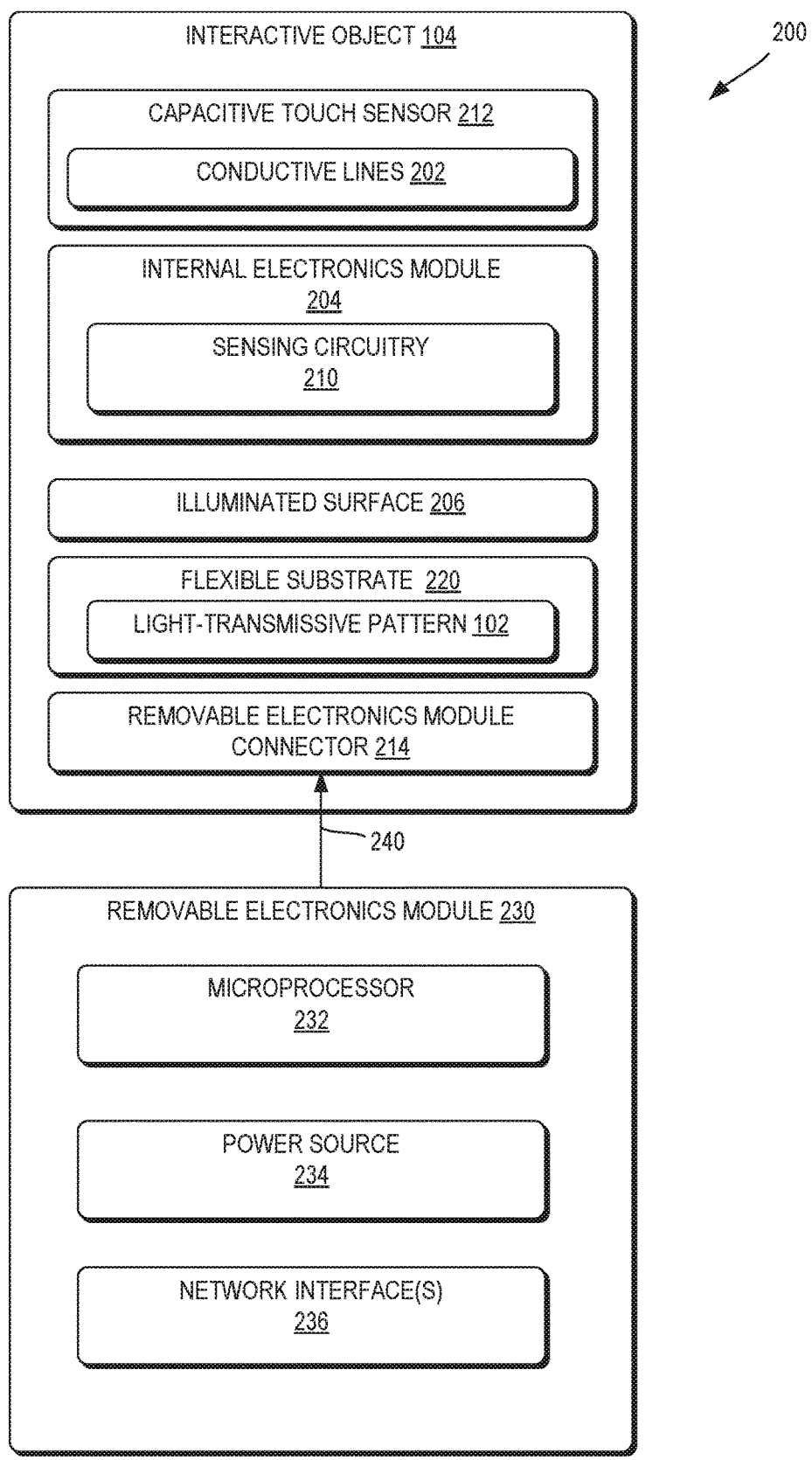
FIG. 2 depicts a block diagram of an example system that includes an interactive object and a removable electronics module in accordance with example embodiments of the present disclosure.

In more detail, consider FIG. 2 which illustrates an example system 200 that includes an interactive object and multiple electronics modules. In system 200, a capacitive touch sensor 212 and an illuminated surface 206 are integrated in an object 104, which may be implemented as a flexible object (e.g., shirt 104-1, hat 104-2, or handbag 104-3) or a hard object (e.g., plastic cup 104-4 or smart phone casing 104-5). Object 104 includes a flexible substrate 220 having a light-transmissive pattern 102 for passing light emitted from the illuminated surface 206 at the inside surface of the flexible substrate to the outside surface of the flexible substrate.

Illuminated surface 206 may include various types of light sources. For example, illuminated surface 206 may include a simple light source having a panel with a surface, or a more enhanced display such an LED panel, OLED panel, etc. The illuminated surface can be an electroluminescent (EL) light panel which can be a thin laminated panel including phosphor. In other implementations, the illuminated surface may include a light source such as a light pipe. Light pipes or tubes can include a pipe for transmitting and/or distributing light for illumination. Another example of an illuminated surface is an electronic or e-ink display. In yet other implementations, the illuminated surface can be a reflective panel that can reflect light under normal lighting conditions and/or reflect a flash from a camera or other light source. The illuminated surface can be non-flexible or flexible to adapt to curved surfaces and surfaces which change over time. For example, the illuminated surface can be coupled to a leather substrate of a backpack, purse, etc. which may change shape as a user moves the object.

In various examples, an illuminated surface may provide a low-level or low-volume light output. For example, an LED panel, OLED panel, EL panel may provide lower light emissions when compared with some light sources. With such panels, providing a partially obscured view of the illuminated surface may potentially further reduce the amount of light that can be emitted from the outside surface of the interactive object and seen by a user. Among the several advantages provided when implemented according to one or more embodiments, problems that can arise in the context of providing a desirable, visual-content-flexible product with sufficient luminosity at a reasonable cost are at least partially addressed, in that it can be desirable for the illuminated surface to be designed to provide a host of different colors and visual effects, to shine through in many different appealing manners, to have low weight, low power, and so forth. However, in addition to their costs, such high-visual-content-rich illuminated displays, such as high-resolution OLED or "Retina" type displays, which are often associated with newer cell phones and similar smart devices, are often not designed for such high brightness applications, and their cost and power requirements only increase as their brightness specifications are increased. Moreover, in accordance with some embodiments, it is desirable to provide a mechanically flexible illuminated surface to underlie the flexible substrate, to make the product even that much more desirable and useful. Such flexible illuminated surfaces, such as those announced for the newest of certain flexible cell phones, introduce even more issues with regard to brightness, cost, and power trade-offs. Therefore, to help resolve the tensions introduced among brightness, visual-content-flexibility, cost, power, and physical characteristics such as mechanical flexibility, it becomes very important to maximize the ability for as many emitted photons as possible to get through the holes of the flexible substrate and into the eye of the viewer, such maximization being one of the features and advantages provided by the shaped holes according to one or more of the described embodiments.

According to example aspects of the disclosed technology, the holes of a light-transmissive pattern may be formed so as to increase the amount of light passed from an illuminated surface positioned adjacent to the inside surface of a substrate to the outside surface of the substrate where it can be viewed by a user. In particular, the holes can be formed so as to maximize the amount of light from a low output illuminated surface such as an OLED panel or EL panel that can be used to illuminate the light-transmissive pattern at the outside surface of the flexible substrate. In some examples, each hole is formed with a first opening at the inside surface of the flexible substrate that is larger than a second opening at the outside surface of the flexible substrate. By way of example, each hole of the light-transmissive pattern can be formed in the flexible substrate with at least a partial conical or other polygonal shape. The larger opening of each hole can be formed adjacent to the illuminated surface which is positioned adjacent to the inside surface of the flexible substrate. In this manner, more light can be transmitted through each hole to illuminate the light-transmissive pattern formed on the outside surface of the flexible substrate. As such, illuminated surfaces that may have lower level light outputs but which provide higher resolution display may be incorporated into flexible substrates using the disclosed technology.

In some examples, the holes of the light-transmissive pattern can be formed at an angle that is offset from the direction normal to the front surface and the back surface of the flexible substrate. In this manner, a controlled viewing angle can be provided for at least a portion of the light-transmissive pattern. The holes can be aligned to match the expected viewing angle of a user. In some cases, privacy can be enhanced by restricting the viewable area to that of the user so that others are unable to see the output of the illuminated surface under normal circumstances.

Interactive object 104 includes an internal electronics module 204 that is embedded within interactive object 104 and is directly coupled to conductive lines 202 and illuminated surface 206. Internal electronics module 204 can be communicatively coupled to a removable electronics module 230 via a communication interface 240. Internal electronics module 204 contains a first subset of electronic components for the interactive object 104, and removable electronics module 230 contains a second, different, subset of electronic components for the interactive object 104. As described herein, the internal electronics module 204 may be physically and permanently embedded within interactive object 104, whereas the removable electronics module 230 may be removably coupled to interactive object 104.

Capacitive touch sensor 212 is configured to sense touch-input from a user when one or more fingers of the user's hand touch capacitive touch sensor 212. Capacitive touch sensor 212 may be configured to sense single-touch, multi-touch, and/or full-hand touch-input from a user. To enable the detection of touch-input, capacitive touch sensor 212 includes conductive lines 202 (e.g., conductive threads, fibers, films), which can be coupled to capacitive touch sensor 212 (e.g., in a grid, array or parallel pattern). Notably, the conductive lines 202 do not alter the flexibility of capacitive touch sensor 212 in example embodiments, which enables capacitive touch sensor 212 to be easily integrated within interactive objects 104.

In system 200, the electronic components contained within the internal electronics module 204 include sensing circuitry 210 that is coupled to conductive lines 202 that are woven or otherwise integrated into capacitive touch sensor 212 (e.g., interactive textile). For example, wires from conductive threads may be connected to sensing circuitry 210 using flexible PCB, creping, gluing with conductive glue, soldering, and so forth. In example embodiments, the sensing circuitry 210 can be configured to detect a user-inputted touch-input on the conductive threads that is pre-programmed to indicate a certain request. In example embodiments, when the conductive threads form a grid or other pattern, sensing circuitry 210 can be configured to also detect the location of the touch-input on conductive lines 202, as well as motion of the touch-input. For example, when an object, such as a user's finger, touches a conductive line 202, the position of the touch can be determined by sensing circuitry 210 by detecting a change in capacitance on the grid or array of conductive line 202. The touch-input may then be used to generate touch data usable to control a computing device 106 or illuminated surface 206. For example, the touch-input can be used to determine various gestures, such as single-finger touches (e.g., touches, taps, and holds), multi-finger touches (e.g., two-finger touches, two-finger taps, two-finger holds, and pinches), single-finger and multi-finger swipes (e.g., swipe up, swipe down, swipe left, swipe right), and full-hand interactions (e.g., touching the textile with a user's entire hand, covering textile with the user's entire hand, pressing the textile with the user's entire hand, palm touches, and rolling, twisting, or rotating the user's hand while touching the textile).

Communication interface 240 enables the transfer of power and data (e.g., the touch-input detected by sensing circuity 210) between the internal electronics module 204 and the removable electronics module 230. In some implementations, communication interface 240 may be implemented as or include a removable electronics module connector 214 that includes a connector receptacle. A connector plug may be implemented at the removable electronics module 230 and be configured to connect to the connector receptacle, which may be implemented at the interactive object 104. Internal electronics module 204 may provide power and/or control signals from removable electronics module 230 to illuminated surface 206. In other examples, removable electronics module 230 may provide power and/or control signals directly to illuminated surface 206.

In system 200, the removable electronics module 230 includes a microprocessor 232, power source 234, and network interface(s) 236. Power source 234 may be coupled, via communication interface 240, to sensing circuitry 210 to provide power to sensing circuitry 210 to enable the detection of touch-input, and may be implemented as a small battery. When touch-input is detected by sensing circuity 210 of the internal electronics module 204, data representative of the touch-input may be communicated, via communication interface 240, to microprocessor 232 of the removable electronics module 230. Microprocessor 232 may then analyze the touch-input data to generate one or more control signals, which may then be communicated to computing device 106 (e.g., a smart phone) via the network interface 236 to cause the computing device 106 to initiate a particular functionality. Generally, network interfaces 236 are configured to communicate data, such as touch data, over wired, wireless, or optical networks to computing devices 106. By way of example and not limitation, network interfaces 236 may communicate data over a local-area-network (LAN), a wireless local-area-network (WLAN), a personal-area-network (PAN) (e.g., Bluetooth™), a wide-area-network (WAN), an intranet, the Internet, a peer-to-peer network, point-to-point network, a mesh network, and the like (e.g., through network 108 of FIG. 1).

While internal electronics module 204 and removable electronics module 230 are illustrated and described as including specific electronic components, it is to be appreciated that these modules may be configured in a variety of different ways. For example, in some cases, electronic components described as being contained within internal electronics module 204 may be at least partially implemented at the removable electronics module 230, and vice versa. Furthermore, internal electronics module 204 and removable electronics module 230 may include electronic components other that those illustrated in FIG. 2, such as sensors, light sources (e.g., LED's), displays, speakers, and so forth. In some examples, the removable electronics module 230 may include illuminated surface 206.

Figure 3:
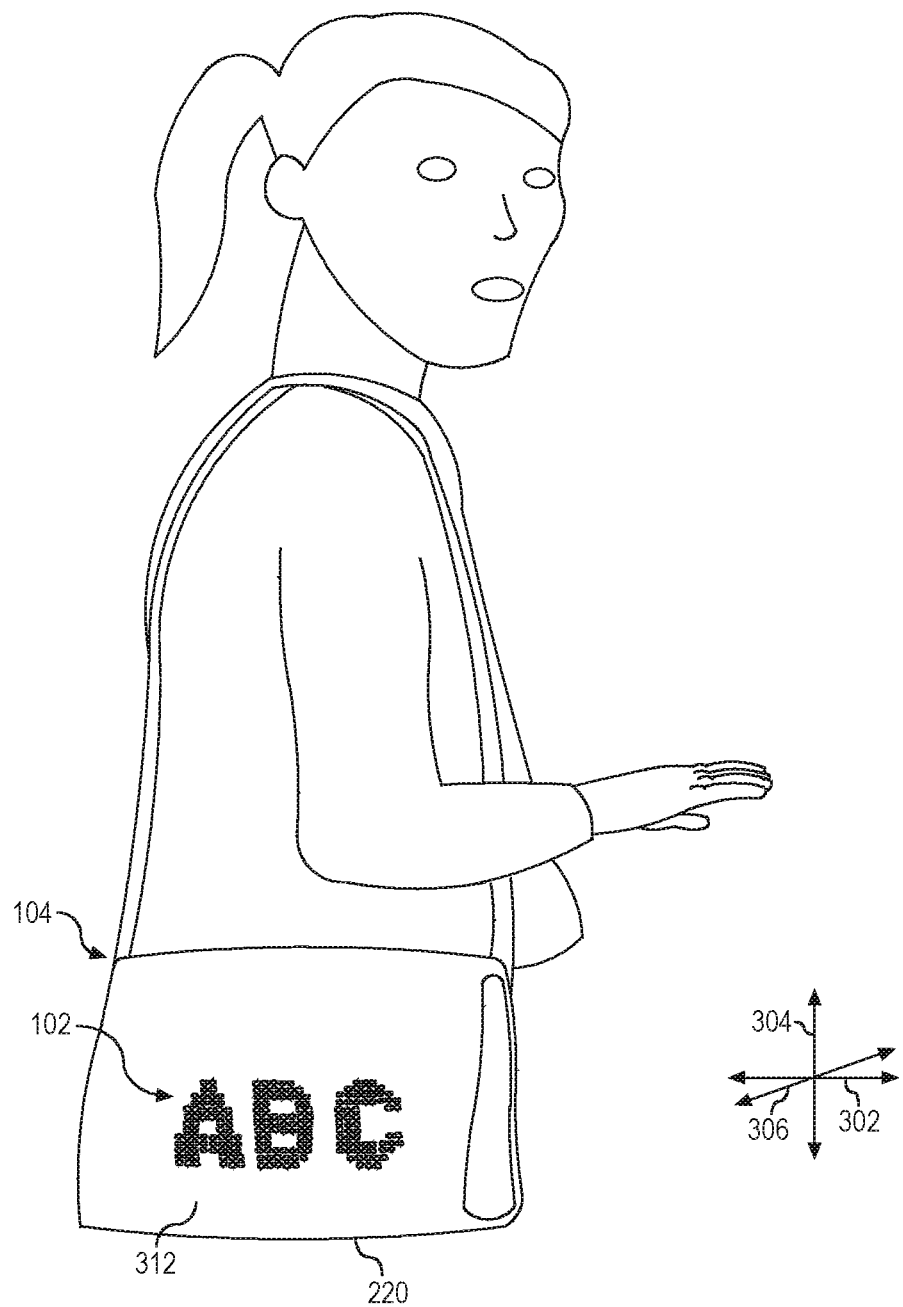
FIG. 3 depicts an example of an interactive object including a light-transmissive pattern formed in a flexible substrate in accordance with example embodiments of the present disclosure.
Figure 5:
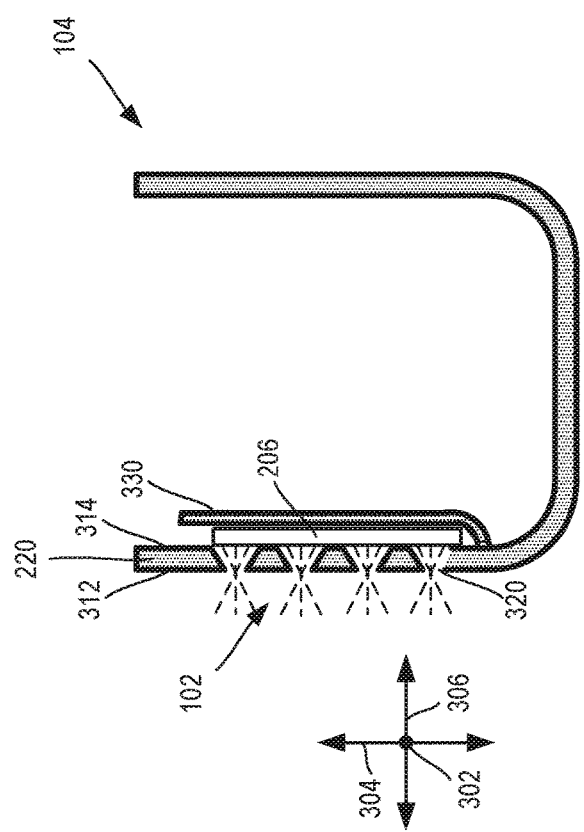
FIG. 5 is a cross-sectional side view of an example interactive object including a pouch for an illuminated surface in accordance with example embodiments of the present disclosure.

FIGS. 3-5 depict an example of an interactive object 104 including a light-transmissive pattern formed adjacent to an illuminated surface in accordance with one or more implementations. An interactive object 104 in accordance with the present disclosure may define a lateral direction 302, a longitudinal direction 304, and a transverse direction 306, as shown. Such directions 302, 304, 306 may together define an orthogonal coordinate system for the interactive object 104. In this example, light-transmissive pattern 102 of the interactive object 104 includes a plurality of holes 320 in a flexible substrate 220 of interactive object 104. Generally, the light-transmissive pattern 102 enhances the transmission of light from an inside surface 314 of the flexible substrate 220 to the outside surface 312 of the flexible substrate 220. In some examples, each hole 320 may have an opening at the inside surface 314 that is larger (e.g., in diameter) than an opening of the hole at the outside surface 312 of the flexible substrate. Such configurations may increase an overall amount of light directed from the front surface of illuminated surface 206 through the flexible substrate. The holes can be formed generally in the direction of the thickness of the flexible substrate in some embodiments (e.g., in the direction normal to the outside surface of the flexible substrate). The direction normal to the outside surface corresponds to the transverse direction 306 shown in FIGS. 3-5. In some examples, each hole 320 may have an opening at the inside surface that is generally the same size as the opening at the outside surface. The holes can be formed in a direction at an angle or incline (e.g., at an offset from the normal direction) relative to the thickness of the flexible substrate. Such configurations may provide a controlled viewing angle for viewing an output of the illuminated surface.

As shown in FIG. 3, the light-transmissive pattern includes a decorative-shape, in this example depicting the letters A, B, and C. The light-transmissive pattern is formed in a flexible substrate which may include soft material such as leather, textiles, fabrics, etc. The light-transmissive pattern includes a plurality of holes 320 that extend from an inner surface of the flexible substrate to an outer surface of the flexible substrate. Although a particular pattern is depicted in FIG. 3, it will be appreciated that any pattern including a set of light-transmissive holes in accordance with embodiments of the present disclosure may be used.

Figure 4A:
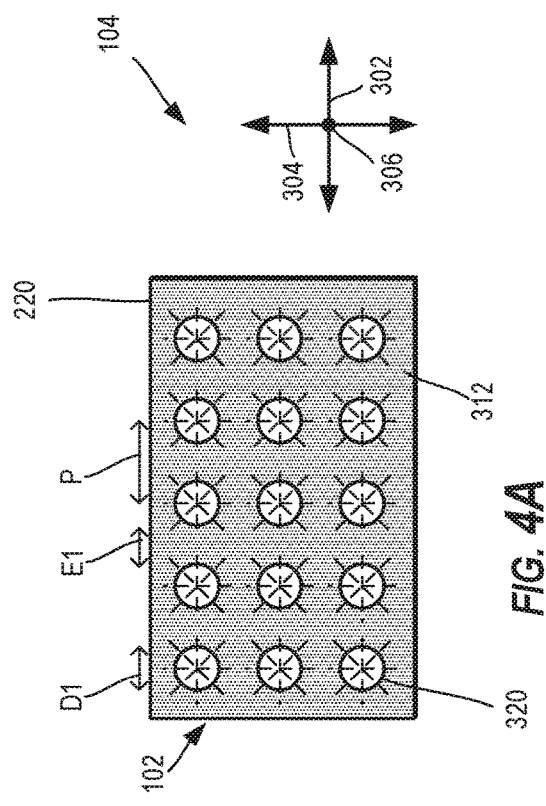
FIG. 4A depicts an example of a light-transmissive pattern including a plurality of hole openings at the outside surface of a flexible substrate in accordance with example embodiments of the present disclosure.
Figure 4B:
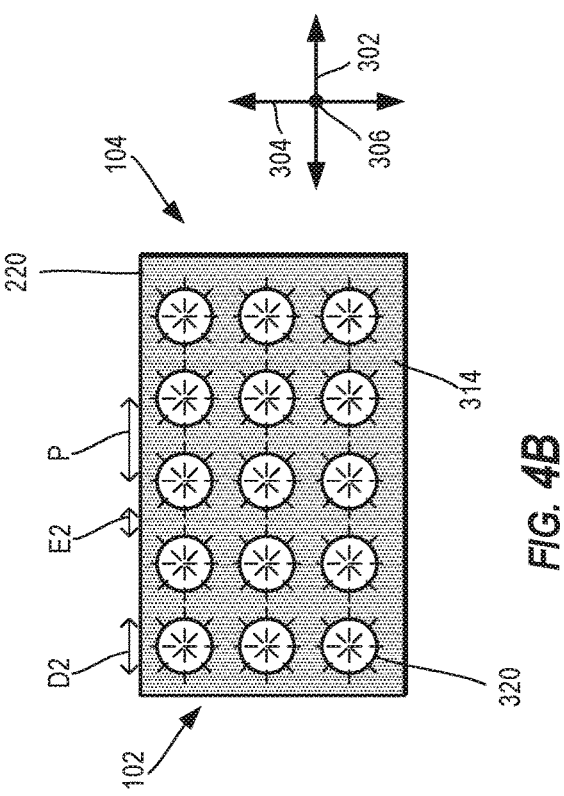
FIG. 4B depicts an example of the light-transmissive pattern of FIG. 4A including a plurality of hole openings at an inside surface of the flexible substrate in accordance with example embodiments of the present disclosure.

FIG. 4A depicts the outside surface 312 of a portion of the flexible substrate 220 of interactive object 104 and FIG. 4B depicts the inside surface 314 of the flexible substrate including light-transmissive pattern 102. A subset of the plurality of holes 320 forming the light-transmissive pattern 102 is depicted. In this example, each hole 320 has a generally conical shape with an opening at the front surface or outside surface 312 that is circular and has a diameter D1. The opening of each hole 320 at the outside surface 312 shown with diameter D1. The center-to-center spacing between holes is shown as a pitch P1. In this particular example, the spacing or pitch P between openings at the outside surface is generally larger than the diameter D1 of each opening. In other examples, however, the pitch between holes may be equal to or less than the diameter of each individual hole. The opening of each hole 320 at the inside surface 312 shown with a diameter D2. D2 is larger than D1. The ratio between the sizes may vary. The center-to-center spacing between openings at the inside surface has the same pitch P as the openings in the outside surface.

The size, shape, and spacing between holes for a light-transmissive pattern can vary based on a particular application or implementation. A hole can generally include any three-dimensional volume having flat surfaces at the terminal ends in a normal direction relative to the surfaces of the substrate. A hole can be conical, polygonal, or polyhedrical in example embodiments. By way of example, a hole can define a conical volume in some examples. A first end of the conical volume can be a flat surface in the plane of the inside surface of the flexible substrate and the second end of the conical volume can be a flat surface in the plane of the outside surface of the flexible substrate. The flat surface at the outside surface can be smaller than the flat surface at the inside surface.

Various dimensions for holes can be used. In example embodiments, the first opening at the inside surface of a hole of a light-transmissive pattern can be less than 10 mm across in example embodiments, such as less than 5 mm, such as less than 1 mm, such as less than 0.5 mm. Similarly, the second opening at the outside surface of a hole of the light-transmissive pattern can be less than 10 mm across in example embodiments, such as less than 5 mm, such as less than 1 mm, such as less than 0.5 mm. Although principally described as a diameter, it will be appreciated that the length across an opening may refer generally to the largest length across the opening of a hole. By way of example, the spacing between holes (e.g., between the closest points of the openings of holes) may be less than 10 mm, such as less than 5 mm, such as less than 1 mm, such as less than 0.5 mm. The size of the hole openings for the second opening can be about 0.5 mm to 1.5 mm in some examples. In such examples, the spacing between holes can be about 1.0 to 3.0 mm. Other shapes, sizes, and spacings may be used.

FIG. 5 depicts a side cross-sectional view of the interactive object 104 including a portion of light-transmissive pattern 102 and illuminated surface 206. Illuminated surface 206 is positioned within a pouch 330 or other retaining member. Pouch 330 is configured to receive illuminated surface 206 so that it can be positioned with its front adjacent to the inside surface 314 of flexible substrate 220. In this particular example, pouch 330 includes a lower portion and a substantially vertical portion which are configured to support illuminated surface 206. The lower portion of pouch 330 can support and provide a vertical positioning of the illuminated surface 206 in the longitudinal direction with alignment to light-transmissive pattern 102. The vertical portion of pouch 330 can support and provide a positioning of illuminated surface 206 in the transverse direction 306. For example, pouch 330 can exert pressure on illuminated surface 206 so the front is positioned adjacent to the inside surface 314 of flexible substrate 220. The pouch may include a connector is some examples, which can connect to a corresponding connector of the illuminated surface. It is noted that the front of illuminated surface 206 may be positioned adjacent to the inside surface 314 without directly touching the inside surface 314. For example, an illuminated light panel may include a bezel or other housing which contacts the inside surface 314. The front surface can extend along at least a portion of the inside surface 314 of the flexible substrate at the one or more locations including the holes 320 of the pattern. The front of illuminated surface 206 is positioned adjacent to the set of holes of light-transmissive pattern 102 to maximize transmission of light from the illuminated surface 206 through the holes to illuminate the light-transmissive pattern 102 on the outside surface 312 of the flexible subject substrate. In this manner interactive object 104 can generate a visual display at location on the interactive object corresponding to light-transmissive pattern 102.

Figure 6:
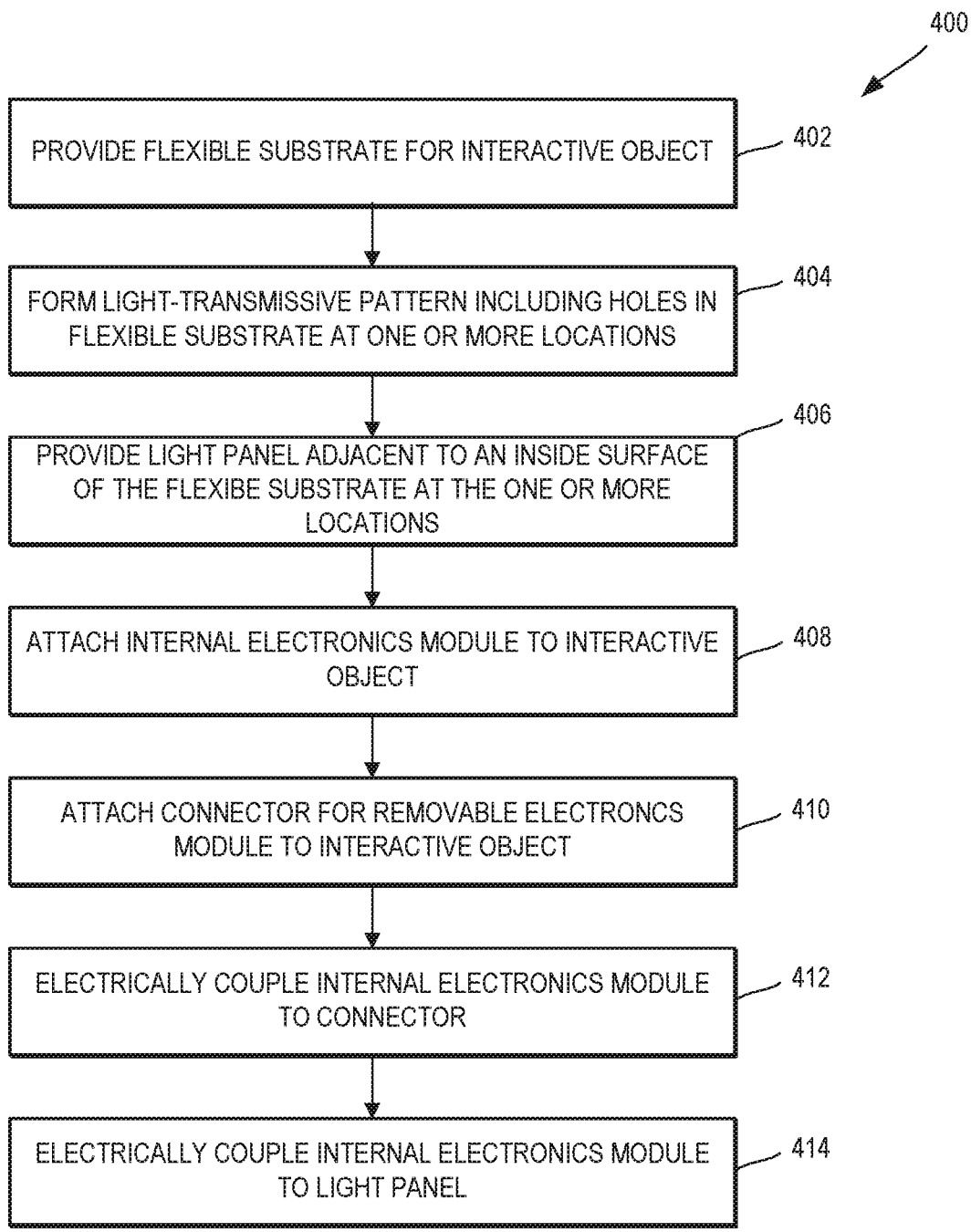
FIG. 6 is a flowchart depicting an example method of manufacturing an interactive object in accordance with example embodiments of the present disclosure.

Various approaches for forming interactive objects that include light-transmissive patterns in a flexible substrate in accordance with example embodiments are described. FIG. 6 is a flowchart depicting an example method 400 of manufacturing an interactive object that includes a light-transmissive pattern for an illuminated surface in accordance with example embodiments. Although FIG. 6 depicts steps performed in a particular order for purposes of illustration and discussion, method 400 of FIG. 6 and the other methods (e.g., method 500 of FIG. 9) described hereinafter are not limited to the particularly illustrated order or arrangement. The various steps of the methods disclosed herein can be omitted, rearranged, combined, and/or adapted in various ways without deviating from the scope of the present disclosure.

At (402), a flexible substrate is provided. In example embodiments, the flexible substrate may include a natural material such as leather or a synthetic material such as rubber, vinyl, etc. Any suitable material such as textiles including a woven fabric or other materials such as flexible plastics, films, etc. can be used. In some implementations, a flexible substrate may be provided on a work surface of a machine such as a laser drilling machine, die cutting machine, or other machine configured to form holes in a flexible substrate.

At (404), a light-transmissive pattern can be formed in the flexible substrate. The light-transmissive pattern includes a set of holes that extend from an inside surface to an outside surface of the flexible substrate at one or more locations. The individual holes may include a larger opening at the inside surface than the outside surface of the flexible substrate in some examples. Additionally, and/or alternatively, each hole can be formed an angle or inclined relative to the thickness of the flexible substrate.

At (406), an illuminated surface is provided adjacent to the inside surface of the flexible substrate of the one or more locations. A retaining member of the interactive object may be used to position the illuminated surface adjacent to the inside surface of the flexible substrate in alignment with the holes of the light-transmissive pattern.

At (408), an internal electronics module is attached to the interactive object. The internal electronics module can be glued, bonded, heat pressed, sewn, or in any other suitable manner affixed to the interactive object. In some examples, the internal electronics module is attached to the flexible substrate. In other examples, the internal electronics module can be attached to another material of the interactive object.

At (410) a connector for a removable electronics module is attached to the interactive object. The connector can be glued, bonded, heat pressed, sewn, or in any other suitable manner affixed to the interactive object. In some examples, the connector is attached to the flexible substrate. In other examples, the connector can be attached to another material of the interactive object.

At (412), the connector can be electrically coupled to the internal electronics module as part of the manufacturing process. For example, the internal electronics module may include a port or other interface that attaches to one or more wires which are coupled to the connector.

At (414), the internal electronics module is electrically coupled to the illuminated surface. In some examples, the internal electronics module can include a port or other interface that attaches to one or more wires which are coupled to the illuminated surface or a light source of the illuminated surface. Other electrical connections between the illuminated surface and the internal electronics model can be made. In some examples, the internal electronics module can be electrically coupled to a connector to which the illuminated surface can be removably connected.

Figure 7:
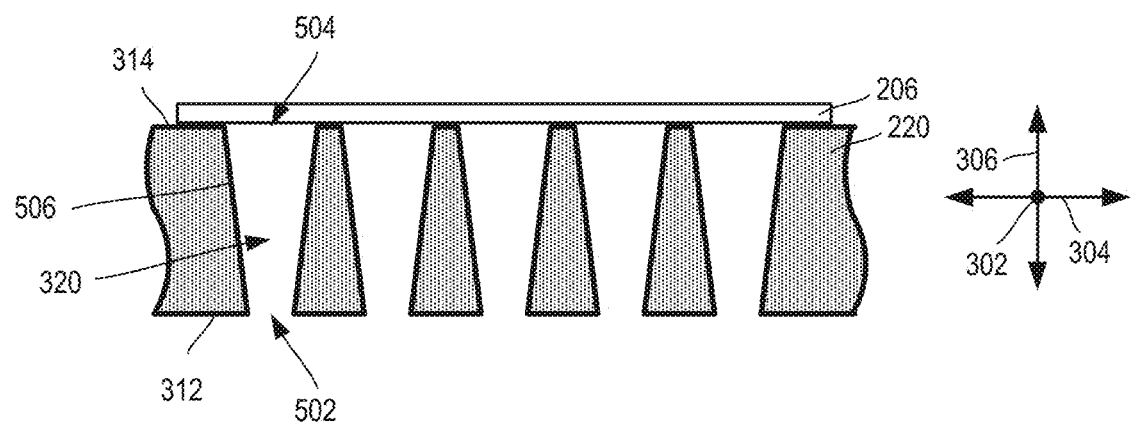
FIG. 7 is a cross-sectional view of an example of a light-transmissive pattern including a plurality of conical-shaped holes having sidewalls with constant angles in accordance with example embodiments of the present disclosure.

FIG. 7 is a cross-sectional view of a set of holes 320 forming a light-transmissive pattern 102 in a flexible substrate 220. Illuminated surface 206 is positioned adjacent to the inside surface 314 of the flexible substrate 220 at a location corresponding to the set of holes 320. The set of holes permit transmission of light from the illuminated surface 206 through the flexible substrate to an opening at an outside surface 312 of the flexible substrate.

Each hole 320 of the light-transmissive pattern 102 includes a first opening 504 at the inside surface of the flexible substrate 220 which is larger than a second opening 502 at the outside surface of the flexible substrate 220. The larger opening of each hole can be formed adjacent to the illuminated surface which is positioned adjacent to the inside surface of the flexible substrate. In this manner, more light can be transmitted through each hole to illuminate the light-transmissive pattern formed on the outside surface of the flexible substrate. Each hole of the light-transmissive pattern has a conical shape in this example. The sidewall 506 of each hole 320 is angled relative to the direction normal (e.g., transverse direction 306) to the inside surface and the outside surface of the flexible substrate. The sidewall of each hole can define a substantially constant angle relative to the front and back surfaces, forming a relatively continuous conical shape between the first opening at the inside surface to the second opening at the outside surface of the flexible substrate.

Figure 8:
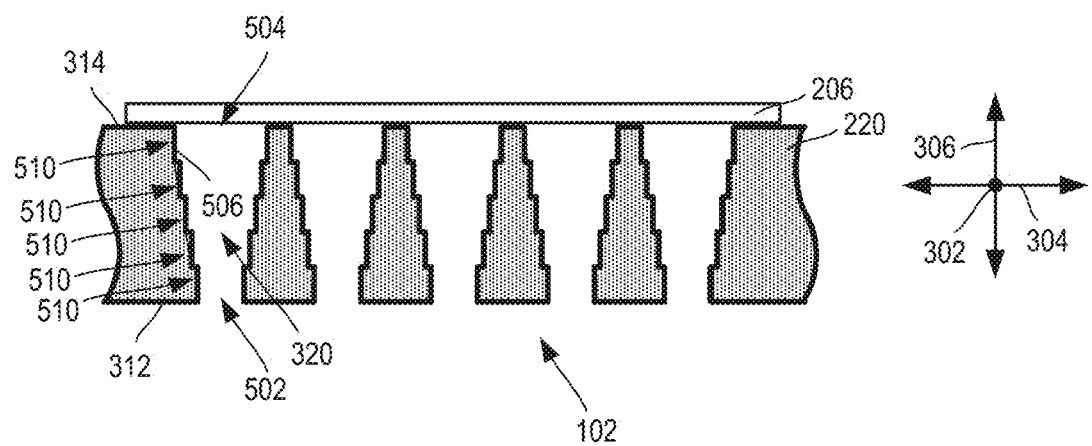
FIG. 8 is a cross-sectional view of an example of a light-transmissive pattern including a plurality of conical-shaped holes having multiple vertical sections in accordance with example embodiments of the present disclosure.

According to some examples, a set of holes can include multiple vertical sections that together define a generally conical shape for each of the holes. FIG. 8 is a cross-sectional view of a set of holes 320 that each include multiple vertical sections. These individual vertical sections, also referred to as rings, together form a conical shape of the hole between the first opening 504 and the second opening 502. Each vertical section 510 can include a substantially vertical portion of sidewall 506 that extends in the transverse direction (e.g., normal to the outside surface and the inside surface). The diameter of each vertical section can be substantially constant along its length in the transverse direction. The individual vertical sections of each hole have a different diameter to form a conical hole shape. The vertical section adjacent to the inside surface has a largest diameter for the hole. The diameter of each other vertical section of the hole is less than the diameters of vertical sections of the hole that are closer to the first opening 504 at the inside surface 314. Although FIG. 8 is described with respect to cylindrical-shaped sections, it will be appreciated that other shapes may be used. For example, each vertical section may define any suitable polygonal-shaped volume.

Figure 9:
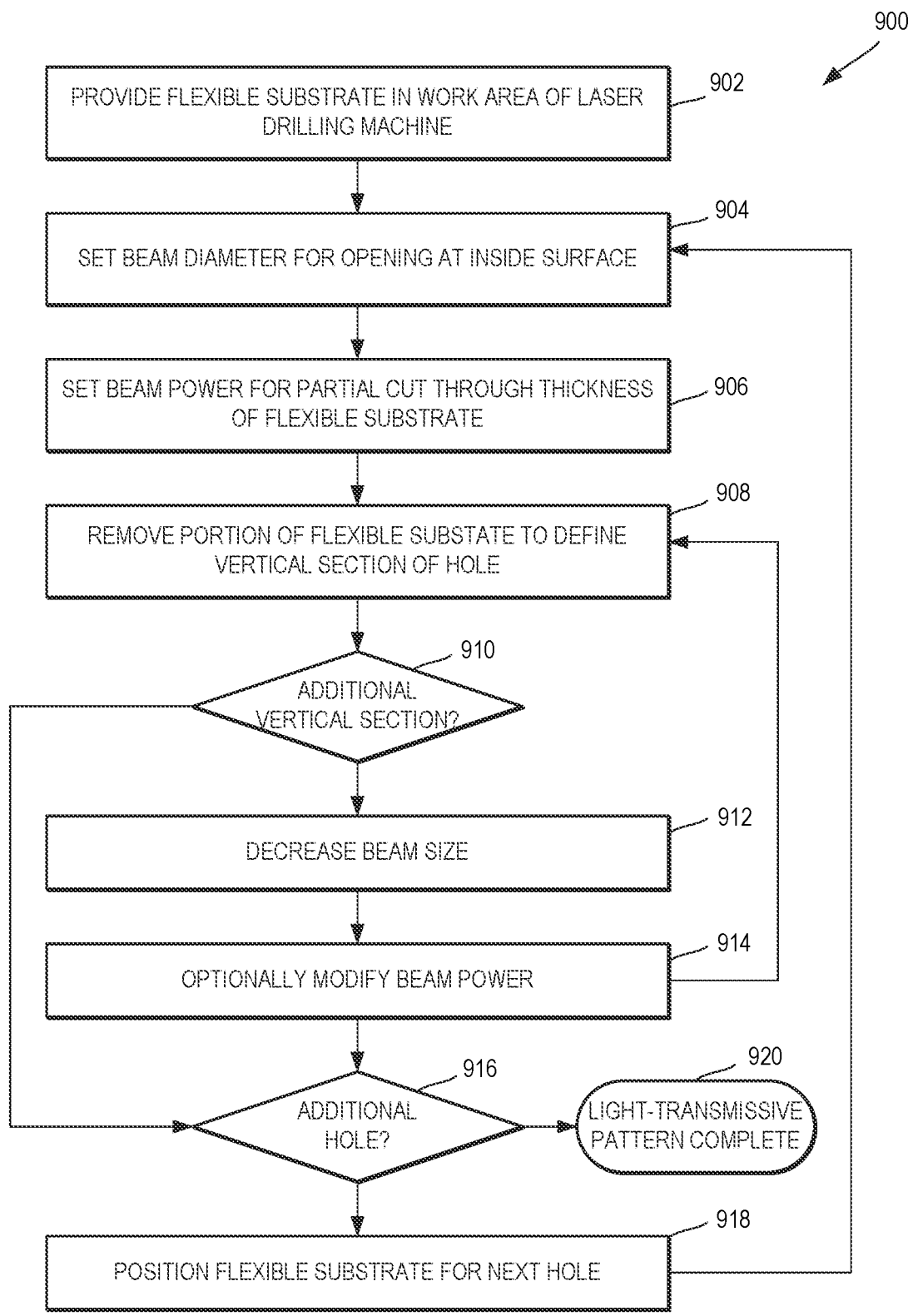
FIG. 9 is a flowchart depicting an example method of forming a light-transmissive pattern using a multi-pass laser drilling process in accordance with example embodiments of the present disclosure.

According to example aspects of the disclosed technology, a laser drilling process can be used to form and control the shape of holes formed in a flexible substrate of an interactive garment. FIG. 9 is a flowchart depicting an example method 900 of manufacturing an interactive object that includes forming a light-transmissive pattern using a laser drilling process. One or more portions of method 900 can be implemented by one or more computing devices in coordination with a laser drilling machine. Method 900 may be implemented by one or more computing devices such as, for example, device(s) 106 as depicted in FIG. 1 or computing system 1002 of FIG. 14. One or more portions of the method 900 described herein can be implemented as an algorithm on the hardware components of the devices described herein (e.g., as in FIG. 14) to, for example, control a laser drilling machine to define one or more holes of a light-transmissive pattern.

Figure 10:
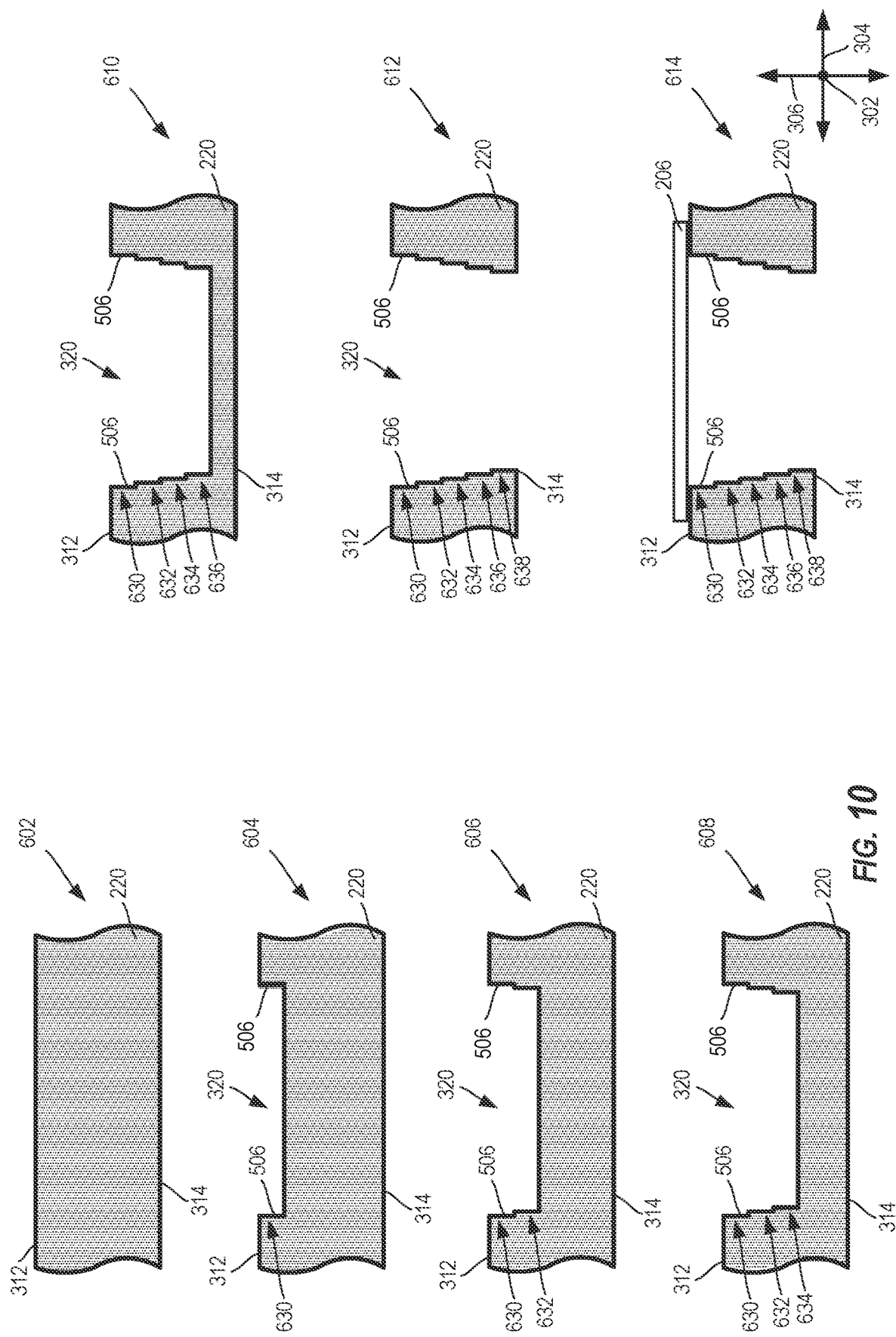
FIG. 10 is a cross-sectional view of an example of a light-transmissive pattern depicting a sequence of laser drilling operations in accordance with example embodiments of the present disclosure.

FIG. 10 is a cross-sectional view of a flexible substrate 220 depicting the formation of a hole 320 of a light-transmissive pattern in accordance with example embodiments of the disclosed technology. FIG. 10 depicts an example of the manufacturing process for flexible substrate in accordance with method 900 depicted in FIG. 9. It will be appreciated, however, that other light-transmissive patterns may be generated in accordance with the technique of method 900 depicted in FIG. 9.

With reference to FIG. 9, at (902), a flexible substrate is provided in a work area of a laser drilling machine. The flexible substrate can be positioned on or affixed to a fixture which can be inserted into a laser drilling machine in some examples. The flexible substrate may be positioned with the inside surface facing the laser beam output so that the laser beam drilling process can be performed from the inside surface of the flexible substrate. The fixture may be adjustable so that it can hold the flexible substrate at a desired angle such as a desired hole angle for holes of the light-transmissive pattern. In other examples, a fixture may not be used. A flexible substrate 220 is depicted in FIG. 10 at 602.

At (904), the beam diameter for the laser beam of the laser drilling machine is set to a target diameter for the opening of the hole at the inside surface of the flexible substrate.

At (906), the beam power is set for a partial cut through the thickness of the flexible substrate. A low-power setting can be used so the laser does not cut through the entire thickness of the flexible substrate.

At (908), the laser beam is applied so that a portion of the flexible substrate is removed to define a first vertical section of the hole. In the first pass of method 900, the removal at 508 defines the first opening of the hole at the inside surface of the flexible substrate.

FIG. 10 depicts the results of (908) at 604 in one example. The laser beam is applied to the inside surface 314 of flexible substrate 220 to define a first vertical section 630 for hole 320. The sidewall 506 of hole 320 at the first vertical section extends in the transverse or vertical direction relative to the inside surface 314 and the outside surface 312 of flexible substrate 220. In other examples, the sidewall 506 of hole 320 may be formed at an angle or incline relative to the inside surface 314.

At (910), it is determined whether additional vertical sections are to be defined for the hole, or whether the hole has been completely defined. If additional vertical sections are to be formed, method 900 proceeds at (912). If additional vertical sections of the hole are not to be formed, method 900 proceeds at (916).

At (912), the beam size of the laser drilling machine is decreased relative to its last application. At (914), the beam power is optionally modified. In some examples, the beam power may be increased or decreased to define vertical sections of different lengths. After adjusting the beam size and optionally modifying the beam power, method (900) returns to (908) where another portion of the flexible substrate is removed using the laser beam. An additional vertical section of the hole is defined by application of the laser beam at 908. The section removed at 908 is smaller in diameter or other dimension relative to the vertical section previously formed.

FIG. 10 depicts a sequence of additional laser drilling operations to define additional vertical sections for hole 320. At (606), the result of forming a second vertical section 632 of hole 320 is depicted. The laser beam is applied to the flexible substrate 220 at the upper surface of the flexible substrate defined by the previous laser drilling operation at (604). A second vertical section 632 for hole 320 is defined. The distance (e.g., diameter) across the hole at vertical section 632 is less than that of vertical section 630.

The result of forming a third vertical section 634 is shown at (608). The laser beam is applied to the flexible substrate 220 at the upper surface of the flexible substrate defined by the laser drilling operation in (606). A third vertical section 634 for hole 320 is defined. The distance (e.g., diameter) across the hole at vertical section 634 is less than that of vertical section 632.

The result of forming a fourth vertical section 636 and a fifth vertical section 638 are shown at (610) and (612), respectively. The distance (e.g., diameter) across the hole at each subsequently formed vertical section is less than that of each previously formed section. For example, the diameter or other distance associated with each vertical section is less than that of each vertical section that is closer to the inside surface. At (612), the laser drilling process cuts through the outside surface of the flexible substrate to define the second opening of the hole.

At (916), it is determined whether additional holes are to be defined for the light-transmissive pattern. If additional holes are to be defined, the flexible substrate is optionally repositioned for the next hole at (918). For example, the fixture can be moved in some examples to reposition the flexible substrate for application of the laser beam. The fixture may be manually or automatically moved. In some examples, the fixture and flexible substrate do not move, however, the laser drilling machine can be repositioned to drill the next hole. After repositioning the flexible substrate and/or the laser drilling machine, method (900) proceeds at (904) to set the beam diameter for the opening of the next hole at the inside surface. At 920, the light-transmissive pattern completes.

Figure 11:
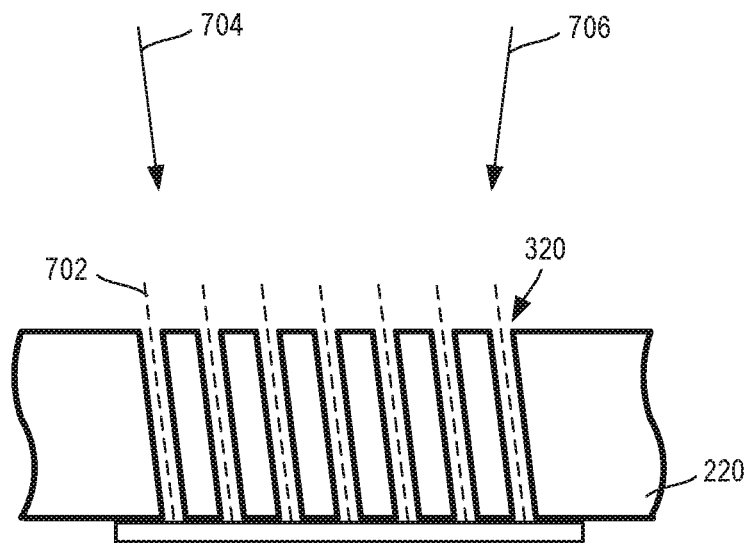
FIG. 11 is a cross-sectional view of an example of a light-transmissive pattern including holes formed at an angle offset from a direction normal to an outside surface of a flexible substrate in accordance with example embodiments of the present disclosure.

According to some example aspects, the holes of the light-transmissive pattern can be formed at an angle that is offset from the direction normal to the front surface and the back surface of the flexible substrate. FIG. 11 is a cross-sectional view of a set of holes 320 forming a light-transmissive pattern 102 in a flexible substrate 220. A front surface of illuminated surface 206 is positioned adjacent to the inside surface of the flexible substrate 220 at a location corresponding to the set of holes 320. The set of holes permit transmission of light from the illuminated surface 206 through the flexible substrate to an opening at an outside surface 312 of the flexible substrate. In this example, the first opening 504 of each hole is substantially equal in size to the second opening 502 of each hole at the outside surface. Each hole may have a cylindrical shape or other polygonal shape for example. In other examples, the first opening 504 may be larger than the second opening 502.

Each hole has one or more sidewalls 506 that define a hole direction 702 from the inside surface to the outside surface. Each hole is formed in the hole direction at an incline or angle relative to the thickness of the flexible substrate from the inside surface to the outside surface. Each sidewall intersects the inside surface and the outside surface of the flexible substrate at an angle offset from a direction normal to the first surface and the second surface. For example, each hole direction 702 is offset from the transverse direction 306 in FIG. 11. In this manner, a controlled viewing angle is provided for at least a portion of the light-transmissive pattern. In this example, a user viewing light-transmissive pattern 102 at an angle 704 which is commensurate with the hole direction may be able to see light emanated from illuminated surface 206. A user viewing light-transmissive pattern 102 at an angle 706 which is not commensurate with the hole direction may be unable to see the light or may be unable to see as much light emanated from the illuminated surface 206. Such a technique can enhance privacy by restricting the viewable area to that of the user so that others are unable to see the output of the illuminated surface under normal circumstances.

Figure 12:
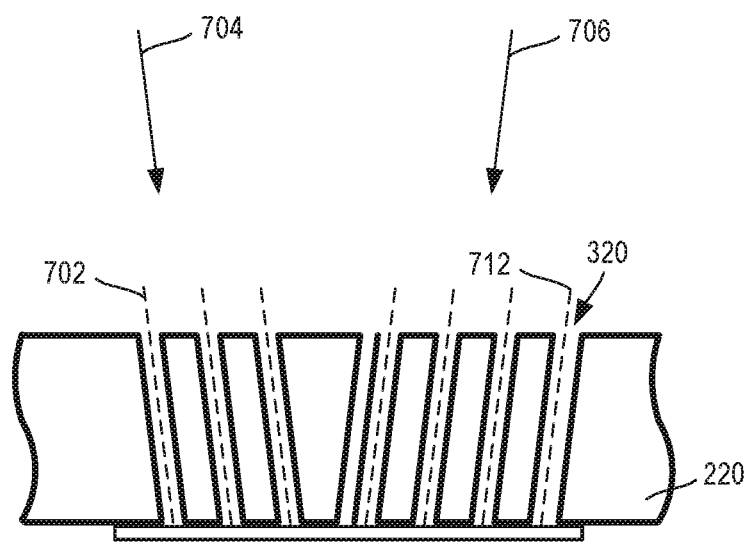
FIG. 12 is a cross-sectional view of an example of a light-transmissive pattern including holes formed at different angles in accordance with example embodiments of the present disclosure.

In some examples, an interactive object can include holes formed in different directions and/or at different angles so that different outputs of the illuminated surface can be directed for different viewing angles. FIG. 12 is a cross-sectional view of a set of holes 320 forming a light-transmissive pattern 102 in a flexible substrate 220. A front surface of illuminated surface 206 is positioned adjacent to the inside surface of the flexible substrate 220 at a location corresponding to the set of holes 320. The set of holes permit transmission of light from the front surface of illuminated surface 206 through the flexible substrate to an opening at an outside surface 312 of the flexible substrate. In this example, the first opening 504 of each hole is substantially equal in size to the second opening 502 of each hole at the outside surface. In other examples, the first of the 504 can be larger than the second of 502. Each hole may have a cylindrical shape or other polygonal shape for example. In other examples, the first opening 504 may be larger than the second opening 502.

A first subset of holes has one or more sidewalls that define a hole direction 702 from the inside surface to the outside surface. A second subset of holes has one or more sidewalls that define a second hole direction 712 from the inside surface to the outside surface. Each hole of the first subset is formed in the hole direction 702 at an incline or angle relative to the thickness of the flexible substrate from the inside surface to the outside surface. Each hole of the second subset is formed in the hole direction 712 at an incline or angle relative to the thickness of the flexible substrate from the inside surface to the outside surface.

By providing different hole directions, different controlled viewing angles are provided. In this example, a user viewing the light-transmissive pattern at an angle 704 which is commensurate with hole direction 702 may be able to see light emanated from a portion of illuminated surface 206 adjacent to the holes having the first hole angle. A user viewing the light-transmissive pattern at an angle 706 which is not commensurate with hole direction 702 may be unable to see the light or may be unable to see as much of the light from the first subset of holes. However, a user viewing the light-transmissive pattern at angle 706, which is commensurate with hole direction 712, may be able to see light emanated from a portion of illuminated surface 206 adjacent to the holes having the second hole angle. A user viewing the light-transmissive pattern at angle 704 which is not commensurate with hole direction 712 may be unable to see the light or may be unable to see as great a proportion of the light from the second subset of holes.

With the technique of FIG. 12, some outputs of illuminated surface 206 can be focused in a direction of a wearer of the interactive garment, while other outputs of the illuminated surface can be focused in other directions. By way of example, a first display type such as a notification or alert from a user's smartphone or other computing device can be directed to a portion of the illuminated surface adjacent to holes that are viewable by a wearer of the interactive object. A second display type such such as a general illumination intended to illuminate the pattern for general view can be output to holes that are viewable with a wider viewing angle and/or at a different direction (e.g., in the direction normal to the front surface).

Figure 13A:
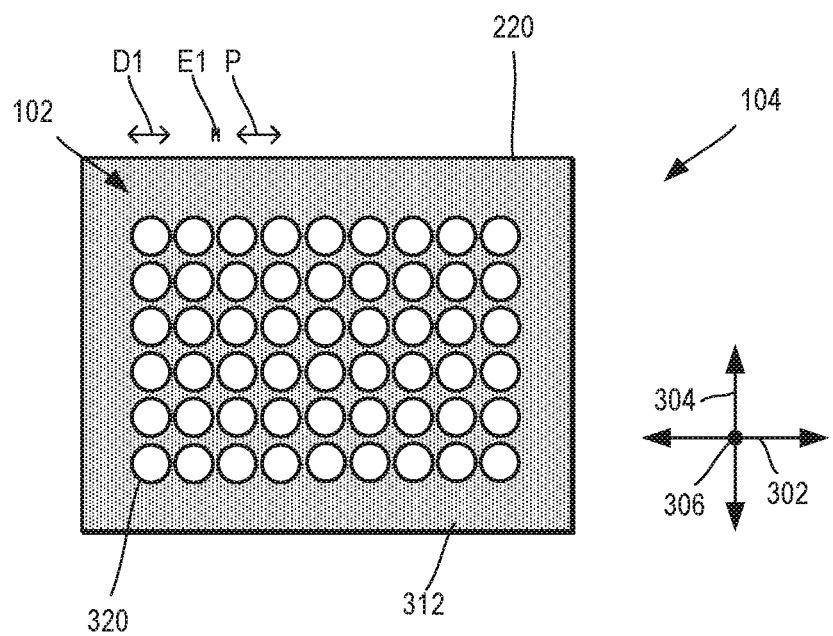
FIG. 13A depicts an example of a flexible substrate comprising a light-transmissive pattern including a plurality of hole openings at the outside surface of a flexible substrate in accordance with example embodiments of the present disclosure.
Figure 13B:
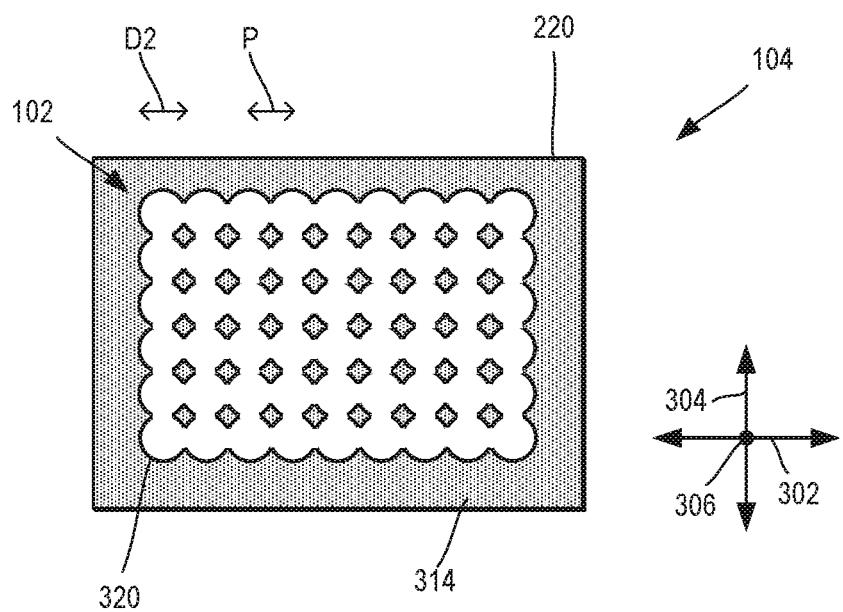
FIG. 13B depicts an example of the light-transmissive pattern of FIG. 13A including a plurality of hole openings at an inside surface of the flexible substrate in accordance with example embodiments of the present disclosure.

In some examples, the second opening of holes at the inside surface of a flexible substrate can be overlapping. FIG. 13A depicts the outside surface of light-transmissive pattern 102 with holes 302 having a diameter D1, edge-to-edge spacing E1, and pitch P. FIG. 13B depicts the inside surface of the light-transmissive pattern 102 in FIG. 13A. In this example, the second openings of the holes at the inside surface are overlapping such that there is no edge-to-edge spacing. This arrangement may further increase the amount of light transmitted through holes 320 to the outside surface.

Figure 14:
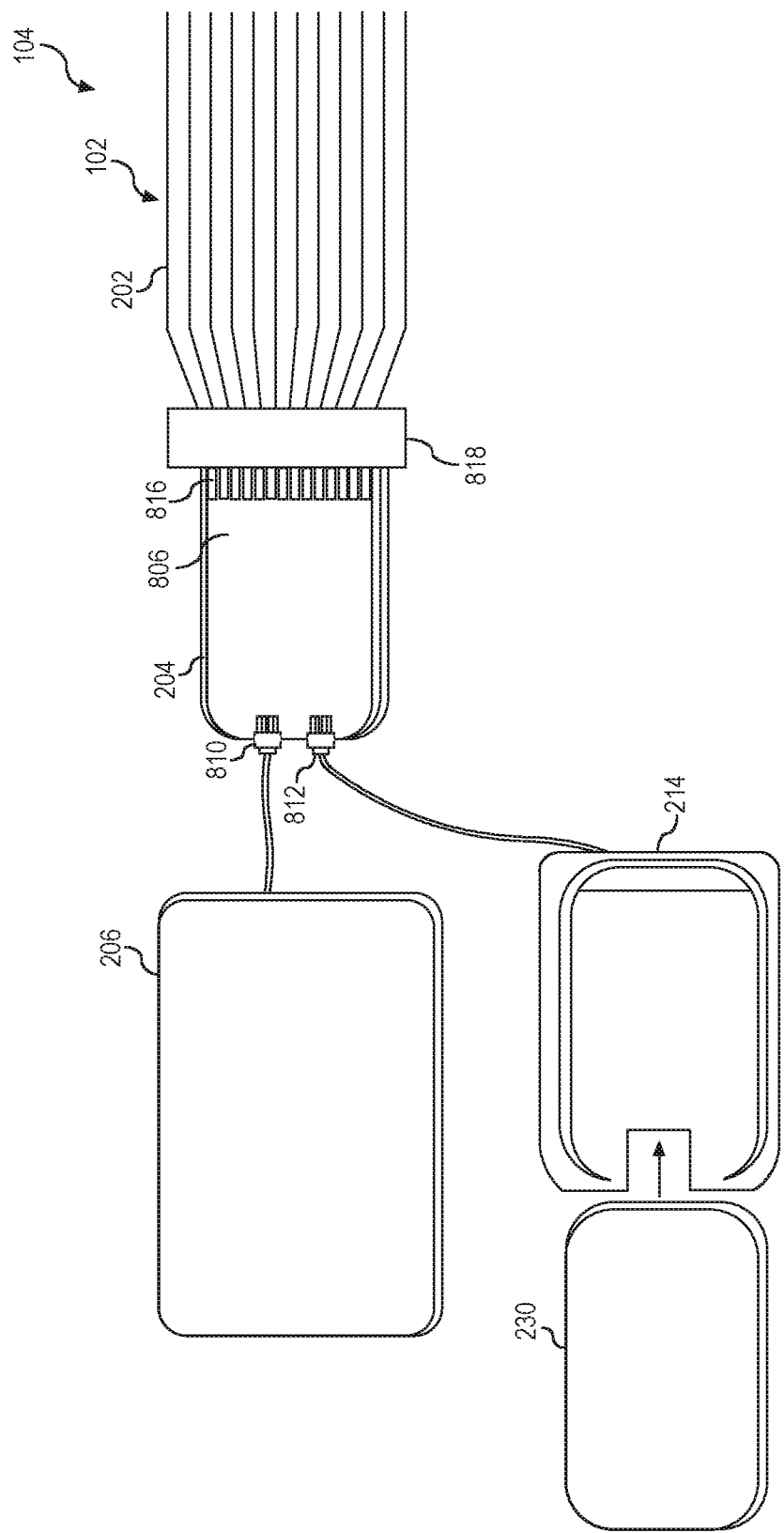
FIG. 14 is a schematic diagram of an example of an interactive object including an illuminated surface and capacitive touch sensor in accordance with example embodiments of the present disclosure.

FIG. 14 illustrates an example of interactive object 104 including an illuminated surface 206 and capacitive touch sensor 212 in accordance with one or more implementations. Internal electronics module 204 can be integrated into the interactive object 104. Illuminated surface 206 can be directly attached to the internal electronics module 204 or can be attached to the internal electronics module via one or more connector components. Illuminated surface 206 may include a direct or indirect light source. The internal electronics module can provide power and/or control signals to the illuminated surface. The internal electronics module may not include an on-board power source in some embodiments. Instead, a removable electronics module 230 can supply power to the internal electronics module.

In some examples, the internal electronics module can include one or more drivers for the illuminated surface. The internal electronics module can include a first subset of electronic components, such as one or more drivers configured to provide control signals and/or power to the illuminated surface. The internal electronics module in some examples comprises a controller that is configured to generate control signals for the illuminated surface based on communication with other electronic components. The controller can be configured to communicate control signals such as from a remote computing device. In some examples, the internal electronics module comprises a flexible printed circuit board (PCB) 806. The printed circuit board can include a set of contact pads 816 and/or one or more ports 810, 812 for attaching to the illuminated surface and/or other components. In some examples, the printed circuit board includes a microprocessor. Port 810 can connect to illuminated surface 206. Illuminated surface 206 can be permanently or removably attached to internal electronics module 204 via port 810. A portion of the PCB (e.g., including the microprocessor) can be overmolded with a polymer composition. The microprocessor 814 can include sensing circuitry 210 in some examples.

In some embodiments, removable electronics module 230 can be removably coupled to the interactive object via connector 214. The connector enables communication between the internal electronics module and the removable electronics module when the removable electronics module is coupled to the interactive object. In example embodiments, the removable electronics module can be removably mounted to a rigid member on the interactive object. A connector 214 can include a connecting device for physically and electrically coupling to the removable electronics module. The internal electronics module can be in communication with the connector via port 812. The internal electronics module can be configured to communicate with the removable electronics module when connected to the connector. A controller of the removable electronics module can receive information and send commands to the internal electronics module. A communication interface is configured to enable communication between the internal electronics module and the controller when the connector is coupled to the removable electronics module. For example, the communication interface may comprise a network interface integral with the removable electronics module. The removable electronics module can also include a rechargeable power source. The removable electronics module can be removable from the interactive object for charging the power source. Once the power source is charged, the removable electronics module can then be placed back into the interactive object and electrically coupled to the connector.

In this example, capacitive touch sensor 212 of the interactive object 104 includes conductive lines 202 which can include a conductive film, wire or a plurality of conductive filaments that are twisted, braided, or wrapped with a flexible thread. The conductive lines 202 can be embroidered or otherwise integrated with non-conductive threads to form a fabric or textile in some examples. In other examples, conductive lines 202 can be affixed to the non-conductive threads using glue, tape, or thread using other sewing techniques.

Conductive lines 202 can include conductive threads including a thin copper wire. It is to be noted, however, that the conductive thread may also be implemented using other materials, such as silver, gold, or other materials coated with a conductive polymer. The conductive thread may include an outer cover layer formed by braiding together non-conductive threads. The non-conductive threads may be implemented as any type of flexible thread or fiber, such as cotton, wool, silk, nylon, polyester, and so forth. An optional ribbon 818 or other connector can be used in attaching the conductive lines 202 to the PCT 806.

In FIG. 14, sensing circuitry can be integrated within internal electronics module 204, and directly connected to conductive lines 202. During operation, sensing circuitry can determine positions of touch-input on the set of conductive lines 202 using self-capacitance sensing, projective capacitive sensing, or mutual capacitance sensing.

The conductive lines 202 and sensing circuitry are configured to communicate the touch data that is representative of the detected touch-input to removable electronics module 230, which is removably coupled to interactive object 104 via connector 214. The removable electronics module may then cause communication of the touch data, via a network interface, to a computing device (e.g., computing device 106 in FIG. 1) to enable the device to determine gestures based on the touch data, which can be used to control object 104, computing device 106, or applications implemented at computing device 106. The computing device 106 can be implemented to recognize a variety of different types of gestures, such as touches, taps, swipes, holds, and covers made to capacitive touch sensor 212. The internal electronics module 204, removable electronics module 230, and/or a computing device may control illuminated surface 206 to generate a desired output or display.

According to some implementations, an illuminated surface with electronics such as an internal electronics module and/or connector for a removable electronics module may be incorporated into a contained assembly that can be applied to objects such as garments, etc. The assembly may include a flexible substrate having an illuminated surface attached thereto. Additionally, an internal electronics module and/or connector for a removable electronics module can be attached to the flexible substrate. The flexible substrate can then be attached to an object such as a garment using glue, tape, a hook and loop fastener, sewing, or another technique. In other examples, the flexible substrate including a set of conductive fibers for example, and electronics, can be attached to a garment, followed by providing an illuminated surface.

Figure 15:
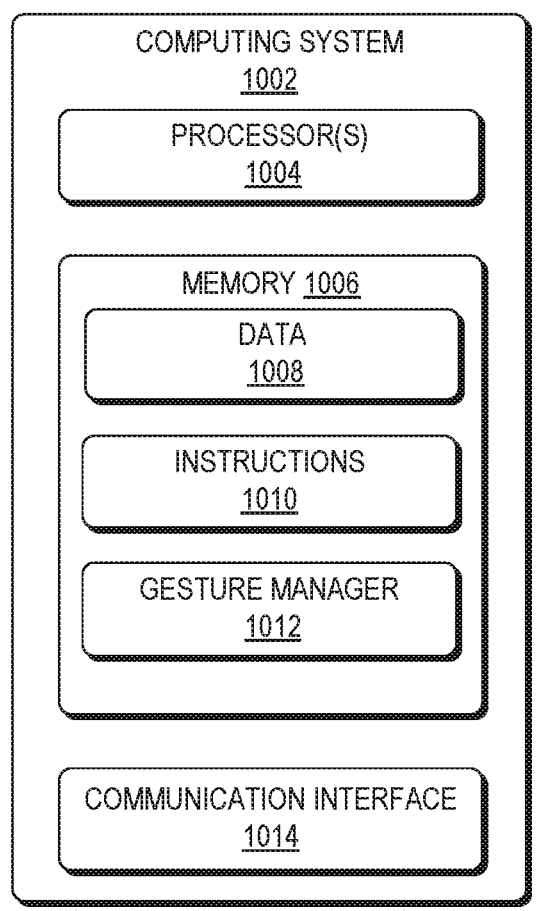
FIG. 15 depicts a block diagram of an example computing system that can be used to implement any type of computing device as described herein.

FIG. 15 illustrates various components of an example computing system 1002 that can implement any type of client, server, and/or computing device described herein. In embodiments, computing system 1002 can be implemented as one or a combination of a wired and/or wireless wearable device, System-on-Chip (SoC), and/or as another type of device or portion thereof. Computing system 1002 may also be associated with a user (e.g., a person) and/or an entity that operates the device such that a device describes logical devices that include users, software, firmware, and/or a combination of devices.

Computing system 1002 includes a communication interface 1014 that enables wired and/or wireless communication of data 1008 (e.g., received data, data that is being received, data scheduled for broadcast, data packets of the data, etc.). Data 1008 can include configuration settings of the device, media content stored on the device, and/or information associated with a user of the device. Media content stored on computing system 1002 can include any type of audio, video, and/or image data. Computing system 1002 includes one or more data inputs via which any type of data, media content, and/or inputs can be received, such as human utterances, touch data generated by capacitive touch sensor 212, user-selectable inputs (explicit or implicit), messages, music, television media content, recorded video content, and any other type of audio, video, and/or image data received from any content and/or data source.

Communication interfaces can be implemented as any one or more of a serial and/or parallel interface, a wireless interface, any type of network interface, a modem, and as any other type of communication interface. Communication interfaces provide a connection and/or communication links between computing system 1002 and a communication network by which other electronic, computing, and communication devices communicate data with computing system 1002.

Computing system 1002 includes one or more processors 1004 (e.g., any of microprocessors, controllers, and the like), which process various computer-executable instructions to control the operation of computing system 1002 and to enable techniques for, or in which can be embodied, interactive textiles. Alternatively or in addition, computing system 1002 can be implemented with any one or combination of hardware, firmware, or fixed logic circuitry that is implemented in connection with processing and control circuits. Although not shown, computing system 1002 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Computing system 1002 also includes memory 1006 which may include computer-readable media, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Memory 1006 may also include a mass storage media device of computing system 1002.

Computer-readable media provides data storage mechanisms to store device data, as well as computer-readable instructions 1010 which can implement various device applications and any other types of information and/or data related to operational aspects of computing system 1002. For example, an operating system can be maintained as a computer application with computer-readable media and executed on processors 1004. Device applications may include a device manager, such as any form of a control application, software application, signal-processing and control module, code that is native to a particular device, a hardware abstraction layer for a particular device, and so on.

Memory 1006 may also include a gesture manager 1012. Gesture manager 1012 is capable of interacting with applications and capacitive touch sensor 212 effective to activate various functionalities associated with computing device 106 and/or applications through touch-input (e.g., gestures) received by capacitive touch sensor 212. Gesture manager 1012 may be implemented at a computing device 106 that is local to object 104 or remote from object 104.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. An interactive object, comprising:
a flexible substrate comprising a soft material that is non-transmissive to light;
a plurality of holes extending from an inside surface of the flexible substrate to an outside surface of the flexible substrate, the plurality of holes forming a light-transmissive pattern at one or more locations of the flexible substrate, each hole including a first opening at the inside surface of the flexible substrate and a second opening at the outside surface of the flexible substrate;
an illuminated surface adjacent to the inside surface of the flexible substrate, the illuminated surface extending along at least a portion of the inside surface of the flexible substrate at the one or more locations including the plurality of holes;
one or more electronic components electrically coupled to a light source of the illuminated surface, the one or more electronic components configured to control the light source to provide a visual output via the illuminated surface, the one or more electronic components including an internal electronics module integrated into the interactive object, the internal electronics module including at least one port;
a first connector integrated into the interactive object and coupled to the internal electronics module via the at least one port; and
a removable electronics module removably coupled to the interactive object via the first connector, the removable electronics module including a processor and a power source configured to communicate with the internal electronics module; and
a second connector integrated into the interactive object and coupled to the internal electronics module via the at least one port;
wherein the illuminated surface is in communication with the internal electronics module via the at least one port and is removably coupled to the interactive object via the second connector.

2. The interactive object of claim 1, wherein:
the first opening of each hole at the inside surface of the flexible substrate is larger than the second opening of such hole at the outside surface of the flexible substrate.

3. The interactive object of claim 1, wherein:
each hole of the plurality of holes has at least a partial conical shape between the first opening and the second opening.

4. The interactive object of claim 2, wherein:
the first opening of each hole has a diameter that is larger than a diameter of the second opening.

5. The interactive object of claim 1, wherein:
each hole of the plurality of holes includes a plurality of vertical sections, each vertical section including a vertical sidewall; and
each vertical section of each hole has a diameter, the diameter of two or more vertical sections of each hole are different.

6. The interactive object of claim 5, wherein:
the diameter of each vertical section of each hole is larger relative to the diameter of vertical sections of such hole that are closer to the second opening.

7. The interactive object of claim 1, wherein the interactive object is a garment, garment accessory, or garment container.

8. The interactive object of claim 1, wherein:
the flexible substrate comprises a user-accessible pouch having an opening, the user-accessible pouch comprising the one or more locations of the flexible substrate; and
the illuminated surface is removable from and insertable into the user-accessible pouch by a user via the opening.

9. The interactive object of claim 1, wherein:
two or more of the plurality of holes include first openings that are overlapping at the inside surface of the flexible substrate.

10. The interactive object of claim 1, wherein:
the illuminated surface is an electroluminescent panel.

11. The interactive object of claim 1, wherein:
the flexible substrate has a thickness between the inside surface and the outside surface; and
each of the holes is formed at an angle that is offset relative to a direction of the thickness of the flexible substrate.

12. The interactive object of claim 11, wherein:
one or more of the plurality of holes define a hole direction relative to the direction of the thickness of the flexible substrate, the hole direction is different from the direction of the thickness of the flexible substrate.

13. The interactive object of claim 1, further comprising:
a capacitive touch sensor comprising a set of conductive lines integrated into the flexible substrate; and
wherein the one or more electronic components include sensing circuitry configured to detect a touch input to the capacitive touch sensor and to control the light source to provide a visual output based at least in part on the touch input.

14. The interactive object of claim 1, wherein:
the one or more electronic components are configured to control the light source based on communication with a remote computing device to provide a visual output with the illuminated surface.

15. The interactive object of claim 1, wherein:
the plurality of holes includes a first subset of holes defining a first direction relative to the inside surface of the flexible substrate and a second subset of holes defining a second direction relative to the inside surface of the flexible substrate;
the one or more electronic components are configured to provide a first output via a first portion of the illuminated surface corresponding to the first subset of holes and a second output via a second portion of the illuminated surface corresponding to the second subset of holes; and the first output is associated with a first display type and the second output is associated with a second display type.

16. An interactive object, comprising:
a flexible substrate non-transmissive to light;
a light-transmissive pattern comprising a plurality of holes extending from an inside surface of the flexible substrate to an outside surface of the flexible substrate, each hole including a first opening at the inside surface of the flexible substrate that is larger than a second opening at the outside surface of the flexible substrate;
an illuminated surface adjacent to the first opening of the plurality of holes at the inside surface of the flexible substrate; and
one or more electronic components electrically coupled to a light source of the illuminated surface, the one or more electronic components configured to control the light source to provide a visual output based at least in part on one or more of an input from a remote computing device or an input from an input device of the interactive object.

17. The interactive object of claim 16, wherein the one or more electronic components include an internal electronics module integrated into the interactive object, the internal electronics module including at least one port, the interactive object further comprising:
a first connector integrated into the interactive object and coupled to the internal electronics module via the at least one port; and
a removable electronics module removably coupled to the interactive object via the first connector, the removable electronics module including a processor and a power source configured to communicate with the internal electronics module;
a second connector integrated into the interactive object and coupled to the internal electronics module via the at least one port;
wherein the illuminated surface is in communication with the internal electronics module via the at least one port and is removably coupled to the interactive object via the second connector.

18. The interactive object of claim 16, further comprising:
a capacitive touch sensor comprising a set of conductive lines integrated into the flexible substrate; and
wherein the one or more electronic components include sensing circuitry configured to detect a touch input to the capacitive touch sensor and to control the illuminated surface to provide a visual output based at least in part on the touch input.

19. An interactive object, comprising:
a flexible substrate comprising a soft material that is non-transmissive to light;
a plurality of holes extending from an inside surface of the flexible substrate to an outside surface of the flexible substrate, the plurality of holes forming a light-transmissive pattern at one or more locations of the flexible substrate, each hole including a first opening at the inside surface of the flexible substrate and a second opening at the outside surface of the flexible substrate;
an illuminated surface adjacent to the inside surface of the flexible substrate, the illuminated surface extending along at least a portion of the inside surface of the flexible substrate at the one or more locations including the plurality of holes;
a capacitive touch sensor comprising a set of conductive lines integrated into the flexible substrate;

one or more electronic components electrically coupled to a light source of the illuminated surface and including sensing circuitry configured to detect a touch input to the capacitive touch sensor, the one or more electronic components configured to control the light source to provide a visual output based at least in part on the touch input.

20. The interactive object of claim 19, wherein the one or more electronic components include an internal electronics module integrated into the interactive object, the internal electronics module including at least one port, the interactive object further comprising:
- a first connector integrated into the interactive object and coupled to the internal electronics module via the at least one port;
- a removable electronics module removably coupled to the interactive object via the first connector, the removable electronics module including a processor and a power source configured to communicate with the internal electronics module; and
- a second connector integrated into the interactive object and coupled to the internal electronics module via the at least one port;
- wherein the illuminated surface is in communication with the internal electronics module via the at least one port and is removably coupled to the interactive object via the second connector.

21. The interactive object of claim 19, wherein:
the illuminated surface is an electroluminescent panel.

22. The interactive object of claim 19, wherein:
the one or more electronic components are configured to control the light source based on communication with a remote computing device to provide the visual output with the illuminated surface.

23. An interactive object, comprising:
- a flexible substrate comprising a soft material that is non-transmissive to light;
- a plurality of holes extending from an inside surface of the flexible substrate to an outside surface of the flexible substrate, the plurality of holes forming a light-transmissive pattern at one or more locations of the flexible substrate, each hole including a first opening at the inside surface of the flexible substrate and a second opening at the outside surface of the flexible substrate;
- an electroluminescent panel adjacent to the inside surface of the flexible substrate, the illuminated surface extending along at least a portion of the inside surface of the flexible substrate at the one or more locations including the plurality of holes; and
- one or more electronic components electrically coupled to a light source of the electroluminescent panel, the one or more electronic components configured to control the light source to provide a visual output via the electroluminescent panel.

24. The interactive object of claim 23, wherein the one or more electronic components include an internal electronics module integrated into the interactive object, the internal electronics module including at least one port, the interactive object further comprising:
- a first connector integrated into the interactive object and coupled to the internal electronics module via the at least one port;
- a removable electronics module removably coupled to the interactive object via the first connector, the removable electronics module including a processor and a power source configured to communicate with the internal electronics module; and
- a second connector integrated into the interactive object and coupled to the internal electronics module via the at least one port;
- wherein the electroluminescent panel is in communication with the internal electronics module via the at least one port and is removably coupled to the interactive object via the second connector.

25. The interactive object of claim 19, further comprising:
- a capacitive touch sensor comprising a set of conductive lines integrated into the flexible substrate; and
- wherein the one or more electronic components include sensing circuitry configured to detect a touch input to the capacitive touch sensor and to control the light source to provide a visual output based at least in part on the touch input.

26. The interactive object of claim 19, wherein:
the one or more electronic components are configured to control the light source based on communication with a remote computing device to provide the visual output with the electroluminescent panel.

* * * * *